US009185694B2

(12) United States Patent
Seo et al.

(10) Patent No.: US 9,185,694 B2
(45) Date of Patent: Nov. 10, 2015

(54) METHOD AND DEVICE FOR TRANSMITTING AND RECEIVING DATA IN WIRELESS COMMUNICATION SYSTEM

(75) Inventors: Hanbyul Seo, Anyang-si (KR); Kijun Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 250 days.

(21) Appl. No.: 13/883,861

(22) PCT Filed: Nov. 8, 2011

(86) PCT No.: PCT/KR2011/008459
§ 371 (c)(1),
(2), (4) Date: May 7, 2013

(87) PCT Pub. No.: WO2012/064079
PCT Pub. Date: May 18, 2012

(65) Prior Publication Data
US 2013/0242853 A1 Sep. 19, 2013

Related U.S. Application Data

(60) Provisional application No. 61/411,426, filed on Nov. 8, 2010.

(51) Int. Cl.
*H04W 72/04* (2009.01)
*H04L 5/00* (2006.01)
(Continued)

(52) U.S. Cl.
CPC ............. *H04W 72/042* (2013.01); *H04B 7/026* (2013.01); *H04B 7/0452* (2013.01);
(Continued)

(58) Field of Classification Search
CPC ... H04W 72/042; H04B 7/0452; H04B 7/026; H04B 7/0617; H04B 7/0619; H04B 7/0456; H04B 7/15592; H04B 25/03891; H04L 5/0048; H04L 5/0053; H04L 5/0023; H04L 5/0035
See application file for complete search history.

(56) References Cited

U.S. PATENT DOCUMENTS 8,767,611 B2 * 7/2014 Bi et al. ................. 370/315
2010/0275083 A1 * 10/2010 Nam et al. ............. 714/748
(Continued)

FOREIGN PATENT DOCUMENTS

EP 2 493 092 A2 8/2012
EP 2 562 943 A2 2/2013
(Continued)

OTHER PUBLICATIONS

3GPP TS 36.216, V10.0.0 (Sep. 2010), 3rd Generation Partnership Project; Technical Specification Group Radio Access Network; Evolved Universal Terrestrial Radio Access (E-UTRA); Physical Layer for Relaying Operation (Release 10), Sep. 2010, 12 pages.

*Primary Examiner* — Chi H Pham
*Assistant Examiner* — Weibin Huang
(74) *Attorney, Agent, or Firm* — Birch, Stewart, Kolasch & Birch, LLP

(57) ABSTRACT

The present invention relates to a method and device for transmitting and receiving data in a wireless communication system. Specifically, the method comprises: a step in which a relay node receives a relay physical downlink control channel (R-PDCCH) including indication information relating to at least one piece of information about a second antenna port and a second scramble ID from a base station by using information about a first antenna port and a first scramble ID; and a step in which the relay node receives a downlink data channel from the base station, wherein the downlink data channel comprises a first downlink data channel region assigned to a portion of a resource block pair to which the relay physical downlink control channel is assigned, and a second downlink data channel region assigned to the other portion of the resource block pair to which the relay physical downlink control channel is assigned, wherein the first downlink data channel region is received using the first antenna and the first scramble ID, and the second downlink data channel region is received using the indication information.

16 Claims, 15 Drawing Sheets

(51) Int. Cl.
*H04B 7/02* (2006.01)
*H04B 7/04* (2006.01)
*H04L 25/03* (2006.01)
*H04B 7/155* (2006.01)
*H04B 7/06* (2006.01)

(52) U.S. Cl.
CPC ........... *H04L 5/0023* (2013.01); *H04L 5/0035* (2013.01); *H04L 5/0048* (2013.01); *H04L 5/0053* (2013.01); *H04B 7/0456* (2013.01); *H04B 7/0617* (2013.01); *H04B 7/0619* (2013.01); *H04B 7/15592* (2013.01); *H04L 25/03891* (2013.01)

(56) References Cited

U.S. PATENT DOCUMENTS

2011/0317610 A1* 12/2011 Park et al. ............. 370/312
2013/0044727 A1* 2/2013 Nory et al. ............. 370/330

FOREIGN PATENT DOCUMENTS

| WO | WO 2010/036008 | A2 | 4/2010 |
| WO | WO 2010/101366 | A2 | 9/2010 |

\* cited by examiner

FIG. 8
(a)
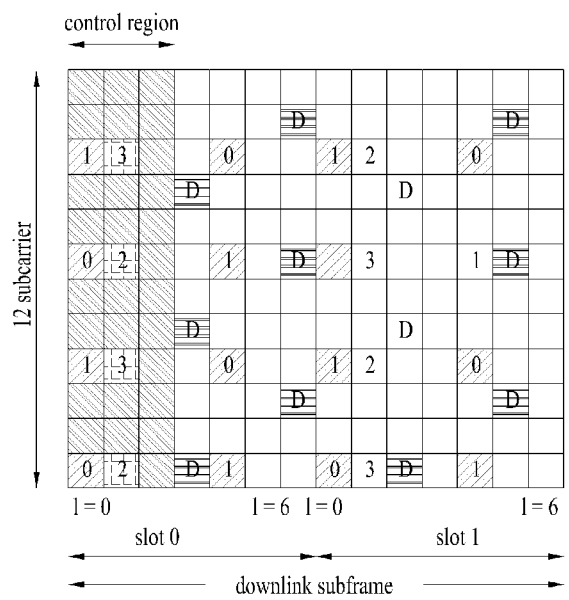
(b)
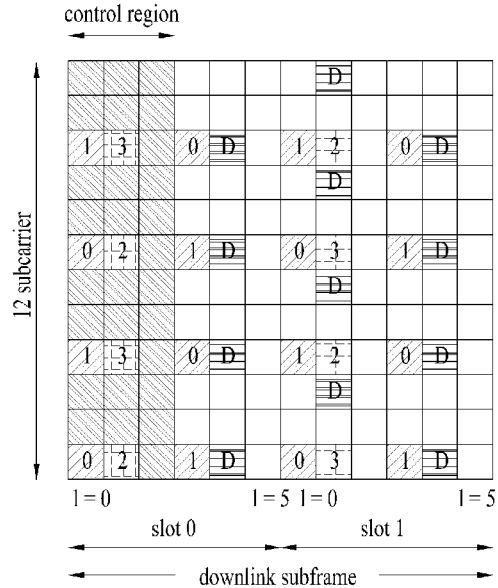

METHOD AND DEVICE FOR TRANSMITTING AND RECEIVING DATA IN WIRELESS COMMUNICATION SYSTEM

CROSS REFERENCE TO RELATED APPLICATIONS

This application is the National Phase of PCT/KR2011/008459 filed on Nov. 8, 2011, which claims priority under 35 U.S.C. 119(e) to U.S. Provisional Application No. 61/411,426 filed on Nov. 8, 2010, all of which are hereby expressly incorporated by reference into the present application.

TECHNICAL FIELD

The present invention relates to a wireless communication system, and more particularly, to a method of transmitting and receiving a data in a relay node supportive of wireless communication system and apparatus therefor.

BACKGROUND ART

FIG. 1 indicates an example of a wireless communication system including a relay node.

Referring to FIG. 1, a wireless communication system includes a base station, a relay node, and a user equipment.

The relay node (RN) indicates a node wirelessly relaying a signal transmitted from a source node to a destination node in a manner of receiving in the middle. The relay node can be considered in order for the user equipment to provide data throughput coverage improvement, group mobility, temporary network arrangement, throughput improvement in a cell boundary region and/or coverage within a new region.

The user equipment may be able to directly perform a communication with the base station or perform a communication with the base station in a manner of hopping twice via the relay node. For clarity, the user equipment directly performing the communication with the base station is called a macro-UE (M-UE) and the user equipment performing the communication with the relay node is called a relay-UE (R-UE) in the following description.

The relay node transmits the data received from the base station to the user equipment situated within a relay node region and may be then able to transmit a data received from the user equipment situated within the relay node region to the base station. For clarity, a radio link between the base station and the relay node is called a backhaul link in the following description. A link from the base station to the relay node is called a backhaul downlink and a link from the relay node to the base station is called a backhaul uplink. In particular, a radio link between the relay node and the user equipment is called an access link. A link from the relay node to the user equipment is called an access downlink and a link from the user equipment to the relay node is called an access uplink.

DISCLOSURE OF THE INVENTION

Technical Task

One object of the present invention is to propose a method of transmitting and receiving data and apparatus therefor to smoothly perform a multiple user-multiple input multiple output antenna operation in a wireless communication system, preferably, in a relay node supportive of wireless communication system.

Another object of the present invention is to propose a method of transmitting and receiving data and apparatus therefor in order for a base station to change a configuration of an antenna port and/or a scramble ID (scramble identity) of each relay node or a user equipment.

A further object of the present invention is to propose a method of transmitting and receiving data and apparatus therefor in order for a base station to differently configure an antenna port and/or a scramble ID (scramble identity) of each relay node or a user equipment.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment a method of receiving a data from a base station in a wireless communication system supporting a Multi User-Multiple Input Multiple Output (Multi User-MIMO) antenna scheme includes the steps of receiving a relay physical downlink control channel (R-PDCCH) comprising an indication information related to at least one of a second antenna port information and a second scramble ID from the base station using a first antenna port information and a first scramble ID (scramble identity) by a relay node and receiving a downlink data channel from the base station, wherein a first downlink data channel region, which is assigned to a part of a resource block pair to which the relay physical downlink control channel is assigned among the downlink data channel, is received using the first antenna port and the first scramble ID and wherein a second downlink data channel region, which is assigned to a region except the resource block pair to which the relay physical downlink control channel is assigned, is received using the indication information.

To further achieve these and other advantages and in accordance with the purpose of the present invention, according to a different embodiment a relay node in a wireless communication system supporting a Multi User-Multiple Input Multiple Output (Multi User-MIMO) antenna scheme includes an RF (radio frequency) unit and a processor configured to receive a relay physical downlink control channel (R-PDCCH) comprising an indication information related to at least one of a second antenna port information and a second scramble ID from the base station using a first antenna port information and a first scramble ID (scramble identity), the processor configured to receive a downlink data channel from the base station, wherein a first downlink data channel region, which is assigned to a part of a resource block pair to which the relay physical downlink control channel is assigned among the downlink data channel, is received using the first antenna port and the first scramble ID and wherein a second downlink data channel region, which is assigned to a region except the resource block pair to which the relay physical downlink control channel is assigned, is received using the indication information.

Preferably, the second downlink data channel region shares a frequency and time region with a downlink data channel region transmitted to a different relay node.

Preferably, the first antenna port information and the first scramble ID are received from the base station via an upper layer signal.

Preferably, at least one of the second antenna port information and the second scramble ID is different from at least one of an antenna port information and a scramble ID configured to a different relay node.

To achieve these and other advantages and in accordance with the purpose of the present invention, as embodied and broadly described, according to one embodiment a method of transmitting a data, which is transmitted by a base station in a wireless communication system supporting a Multi User-Multiple Input Multiple Output (Multi User-MIMO) antenna scheme includes the steps of transmitting a relay physical downlink control channel (R-PDCCH) comprising an indication information related to at least one of a second antenna port information and a second scramble ID from the base station using a first antenna port information and a first scramble ID (scramble identity) to a relay node and transmitting a downlink data channel to the relay node, wherein a first downlink data channel region, which is assigned to a part of a resource block pair to which the relay physical downlink control channel is assigned among the downlink data channel, is transmitted using the first antenna port and the first scramble ID and wherein a second downlink data channel region, which is assigned to a region except the resource block pair to which the relay physical downlink control channel is assigned, is transmitted using the indication information.

To further achieve these and other advantages and in accordance with the purpose of the present invention, according to a different embodiment a base station in a wireless communication system supporting a Multi User-Multiple Input Multiple Output (Multi User-MIMO) antenna scheme includes an RF (radio frequency) unit and a processor configured to transmit a relay physical downlink control channel (R-PDCCH) comprising an indication information related to at least one of a second antenna port information and a second scramble ID to a relay node using a first antenna port information and a first scramble ID (scramble identity), the processor configured to transmit a downlink data channel to the relay node, wherein a first downlink data channel region, which is assigned to a part of a resource block pair to which the relay physical downlink control channel is assigned among the downlink data channel, is transmitted using the first antenna port and the first scramble ID and wherein a second downlink data channel region, which is assigned to a region except the resource block pair to which the relay physical downlink control channel is assigned, is transmitted using the indication information.

Preferably, the second downlink data channel region shares a frequency and time region with a downlink data channel region transmitted to a different relay node.

Preferably, the first antenna port information and the first scramble ID are transmitted to the relay node via an upper layer signal.

Preferably, at least one of the second antenna port information and the second scramble ID is different from at least one of an antenna port information and a scramble ID configured to a different relay node.

It is to be understood that both the foregoing general description and the following detailed description are exemplary and explanatory and are intended to provide further explanation of the invention as claimed.

Advantageous Effects

According to embodiments of the present invention, a multi user-multi input multi output antenna technology can be operated in a wireless communication system, preferably, in a relay node supportive of wireless communication system.

And, according to embodiments of the present invention, a base station may be able to change a configuration of an antenna port and/or a scramble ID of each relay node or a user equipment by transmitting a control channel.

And, according to embodiments of the present invention, a base station may be able to differently configure an antenna port and/or a scramble ID of each relay node or each user equipment by changing the configuration of the antenna port and/or the scramble ID via a control channel.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 8 is a diagram for a reference signal pattern mapped to a downlink resource block (RB) pair defined by 3GPP LTE system;

BEST MODE

Mode for Invention

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details.

Occasionally, to prevent the present invention from getting more vague, structures and/or devices known to the public are skipped or can be represented as block diagrams centering on the core functions of the structures and/or devices. Wherever possible, the same reference numbers will be used throughout the drawings to refer to the same or like parts.

First of all, the following description of the present invention may be usable for various wireless access schemes including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution) and the like. OFDMA can be implemented with such a radio technology as IEEE (Institute of Electrical and Electronics Engineers) 802.11 (Wi-Fi), IEEE 802.16 (WiMAX), IEEE 802.20, E-UTRA (Evolved UTRA) and the like. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE adopts OFDMA in DL and SC-FDMA in UL. And, LTE-A (LTE-Advanced) is an evolved version of LTE.

For clarity, although the present invention is described centering on 3GPP LTE/LTE-A, the technical idea of the present invention may be non-limited to the 3GPP LTE/LTE-A system.

Figure 2:
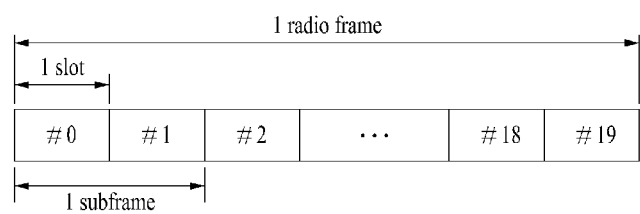
FIG. 2 is a diagram for a structure of a radio frame in 3GPP LTE system.

FIG. 2 is a diagram for a structure of a radio frame in 3GPP LTE system.

Referring to FIG. 2, a radio frame may include 10 subframes. One subframe consists of 2 slots in time domain. A time taken for transmitting one subframe may be called a transmission time interval (TTI). For instance, a length of one subframe may correspond to 1 ms and a length of one slot may correspond to 0.5 ms.

One slot includes a plurality of OFDM (orthogonal frequency division multiplexing) symbols in time domain. Since 3GPP LTE uses OFDMA in DL, the OFDM symbol is used to represent a symbol period. The OFDM symbol may correspond to a SC-FDMA symbol or a symbol period. A resource block is a resource allocation unit and includes a plurality of contiguous subcarriers in a slot.

A structure of a radio frame is exemplary only. The number of subcarriers included in a radio frame, the number of slots included in a subframe, or the number of OFDM symbols included in a slot may change variously.

Figure 3:
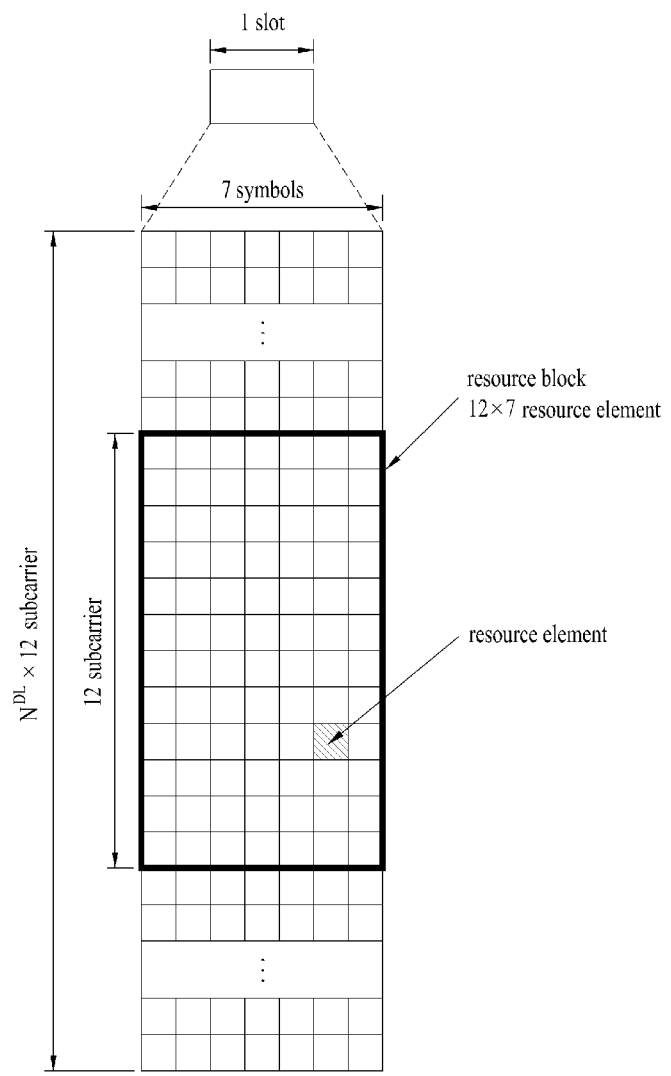
FIG. 3 is a diagram for one example of a resource grid for one downlink slot.

FIG. 3 is a diagram for one example of a resource grid for one downlink slot.

Referring to FIG. 3, one DL slot may include a plurality of OFDM symbols in time domain. In particular, one DL slot includes 7 OFDMA slots and one resource block (RB) includes 12 subcarriers in frequency domain, which is just exemplary and by which the present invention may be non-limited.

Each element on a resource grind may be called a resource element and one resource block (RB) includes 12×7 resource elements. The number $N^{DL}$ of resource blocks included in a DL slot may depend on a DL transmission bandwidth set for a cell. The above-mentioned resource grid for the DL slot may be applicable to a UL slot as well.

Figure 4:
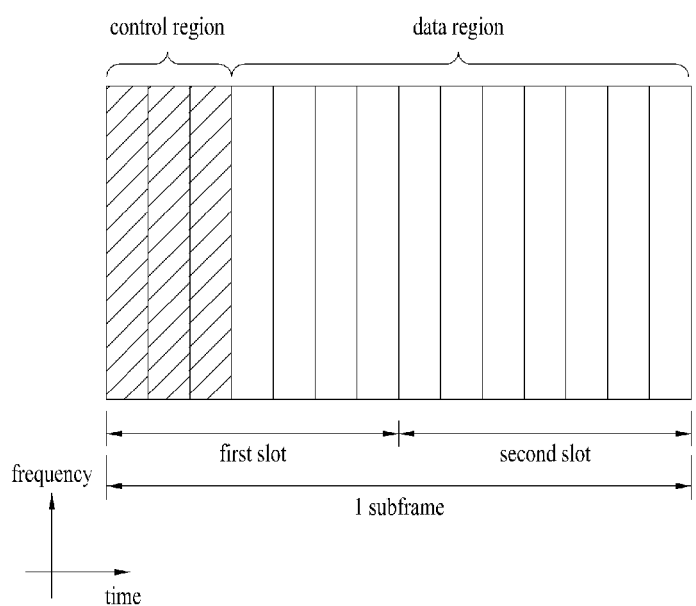
FIG. 4 is a diagram for a structure of a downlink subframe.

FIG. 4 is a diagram for a structure of a downlink subframe.

Referring to FIG. 4, maximum 3 fore OFDM symbols of a first slot within a subframe may correspond to a control region to which DL control channels are allocated. And, the rest of OFDM symbols may become a data region to which PDSCH (physical downlink shared channel) is allocated. Examples of a DL control channel used in 3GPP LTE may include PCFICH (Physical Control Format Indicator Channel), PDCCH (Physical Downlink Control Channel), PHICH (Physical Hybrid-ARQ Indicator Channel) and the like.

The PCFICH carried on a first OFDM symbol of a subframe may carry information on the number of OFDM symbols (i.e., a size of a control region) used for a transmission of control channels in the subframe. The PHICH is a response channel for UL and carries ACK/NACK (acknowledgement/not-acknowledgement) signal for HARQ (hybrid automatic repeat request). Control information carried on PDCCH may be called downlink control information (DCI). The DCI may include UL resource allocation information, DL resource allocation information, or UL transmit power control command for random UE groups.

The PDCCH may be able to carry resource allocation and transmission format (this is called a DL grant) of a DL-SCH (downlink shared channel), resource allocation information (this is called an UL grant) of an UL-SCH, paging information on a PCH (paging channel), system information on the DL-SCH, resource allocation for such an upper layer control message as a random access response transmitted on PDSCH, aggregation of transmit power control commands for individual UEs within a random UE group, VoIP (voice over IP) and the like. A plurality of PDCCHs can be transmitted in a control region and a user equipment may be able to monitor a plurality of the PDCCHs. The PDCCH consists of one or a set of a plurality of contiguous CCEs (control channel elements). The CCE is a logical allocation unit used for providing the PDCCH with a coding rate according to a state of a radio channel. The CCE corresponds to a plurality of resource element groups. The format of PDCCH and the number of available bits of PDCCH are determined by the relationship between the number of CCEs and the coding rate provided by the CCEs.

A base station determines PDCCH format in accordance with DCI to transmit to a user equipment and attaches CRC (cyclic redundancy check) to control information. The CRC is masked with a unique identifier (called RNTI (radio network temporary identifier) in accordance with an owner or usage of PDCCH. If the PDCCH is provided for a specific user equipment, the CRC can be masked with a unique identifier of the user equipment, i.e., C-RNTI (i.e., Cell-RNTI). If the PDCCH is provided for a paging message, the CRC can be masked with a paging indication identifier (e.g., P-RNTI (Paging-RNTI)). If the PDCCH is provided for system information, and more particularly, for a system information block (SIB), the CRC can be masked with a system information identifier (e.g., SI-RNTI (system information-RNTI). In order to indicate a random access response that is a response to a transmission of a random access preamble of a user equipment, CRC can be masked with RA-RNTI (random access-RNTI).

Figure 5:
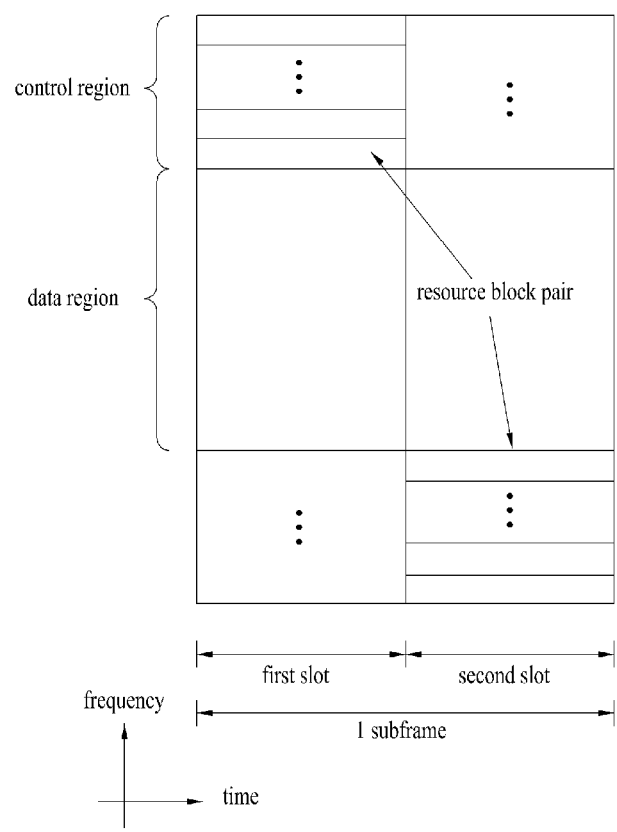
FIG. 5 is a diagram for a structure of an uplink subframe.

FIG. 5 is a diagram for a structure of an uplink subframe.

Referring to FIG. 5, a UL subframe may be divided into a control region and a data region in frequency domain. A physical UL control channel (PUCCH), which carries UL control information, is allocated to the control region. And, a physical UL shared channel (PUSCH), which carries user data, is allocated to the data region. In order to maintain single carrier property, one user equipment does not transmit PUCCH and PUSCH simultaneously. A resource block pair (RB pair) in subframe is allocated to PUCCH for one user equipment. Resource blocks belonging to the resource block (RB) pair may occupy different subcarriers in each of 2 slots. Namely, a resource block pair allocated to PUCCH is frequency-hopped on a slot boundary.

MIMO (Multi-Input Multi-Output) System Modeling

MIMO technology corresponds to an abbreviation of Multi-Input Multi-Output technology. Instead of generally using a single transmitting antenna and a single receiving antenna, the MIMO technology uses multiple transmitting (Tx) antennas and multiple receiving (Rx) antennas. In other word, the MIMO technology is a technology using a plurality of the antennas at a transmitting end or a receiving end in a radio communication system to increase a capacity and enhance performance. In the following description, the MIMO may be called a 'multi input/output antenna'.

More specifically, the multi input/output antenna technology may not depend on a single antenna path to receive a whole message. Data is completed in a manner of combining data fragments received from many antennas in one place in the multi input/output antenna technology instead. Consequently, when the multi input/output antenna technology is used, a data transmission speed may be enhanced in a specific system coverage or the system coverage may be enlarged via the specific data transmission speed.

Since a next generation mobile communication requires much faster data transmission speed compared to a conventional mobile communication, it is anticipated that the efficient multi input/output antenna technology is essentially required. Under this circumstance, the MIMO communication technology may correspond to a next generation mobile communication technology capable of widely being used for a mobile communication terminal, a relay node, and the like. The MIMO communication technology is getting a spotlight as a technology capable of overcoming traffic limit of a different mobile communication due to the expansion of data communication and the like.

Meanwhile, the multi input/output (MIMO) antenna technology among the currently studied various transmission efficiency enhancing technologies corresponds to the method capable of considerably enhancing communication traffic and transmission/reception performance without an additional frequency assignment or power increase. Thus, the multi input/output (MIMO) antenna technology currently receives most attention.

Figure 6:
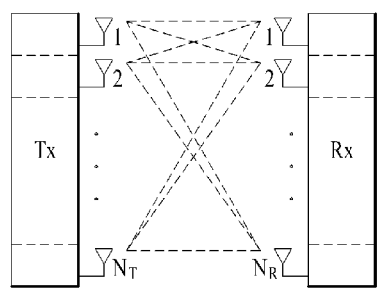
FIG. 6 is a diagram for a structure of a general multiple input multiple output (MIMO) antenna communication system.

FIG. 6 is a diagram for a structure of a general multiple input multiple output (MIMO) antenna communication system.

Referring to FIG. 6, $N_T$ number of transmitting antenna is installed in a transmitting end and $N_R$ number of receiving antenna is installed in a receiving end simultaneously. In case that both the transmitting end and the receiving end use plural number of antennas, a theoretical channel transmission capacity is increased compared to a case that the plural number of antennas are only used for either the transmitting end or the receiving end. The increase of the channel transmission capacity is proportional to the number of antenna. Thus, a transfer rate is enhanced and frequency efficiency is enhanced. If a maximum transfer rate is represented as ($R_o$) in case of using a single antenna, the transfer rate according to the increase of the channel transmission capacity can be theoretically increased as much as the maximum transfer rate ($R_o$) multiplied by a rate of increase $R_i$.

$$R_i = \min(N_T, N_R)$$ [Formula 1]

For instance, MIMO communication system using 4 transmitting antennas and 4 receiving antennas may be able to theoretically obtain the transfer rate of 4 times of a single antenna system.

The MIMO antenna technology can be divided into a spatial diversity scheme enhancing transmission reliability using symbols passed through various channel paths and a spatial multiplexing scheme increasing transmission rate by simultaneously transmitting a plurality of data symbols using a plurality of transmitting antennas. And, many ongoing efforts are made to obtain the merit of each scheme in a manner of appropriately combining both of the two schemes.

Each of the schemes is explained in more detail in the following description.

First of all, the spatial diversity scheme includes a space-time block code scheme and a space-time Trelis coding scheme simultaneously using diversity gain and a coding gain. In general, the Trelis coding scheme is superior in a bit error rate improving performance and a code generation. Yet, the space-time block code scheme is simpler than the Trelis coding scheme in terms of calculation complexity. The spatial diversity gain can be obtained as many as the number ($N_T * N_R$) resulted from multiplying the number of transmitting antenna ($N_T$) by the number of receiving antenna ($N_R$).

Secondly, the spatial multiplexing scheme is the scheme transmitting data rows different with each other in each of transmitting antennas. In this case, interference occurs at a receiver between simultaneously transmitted data from a transmitter. The receiver receives the data in a manner of eliminating the interference using an appropriate signal processing scheme. A noise rejection scheme used for the above situation may include an MLD (maximum likelihood detection) receiver, a ZF (zero-forcing) receiver, an MMSE (minimum mean square error) receiver, a D-BLAST (Diagonal-Bell Laboratories Layered Space-Time), a V-BLAST (Vertical-Bell Laboratories Layered Space-Time), and the like. In particular, in case that a transmitting end is able to know channel information, a SVD (singular value decomposition) scheme can be used.

Thirdly, there exists a scheme combined the spatial diversity and the spatial multiplexing. In case of obtaining the spatial diversity gain only, performance improvement gain is gradually saturated according to the increase of the order of diversity. In case of obtaining the spatial multiplexing gain only, transmission reliability is degraded in a radio channel. Schemes obtaining two kinds of merit as well solving the aforementioned problems have been studied and may include a double space-time block code (double-STTD) scheme, a space-time BICM (STBICM) scheme, and the like.

In order to explain the aforementioned communication method in a MIMO antenna system with a detailed method, a mathematical modeling is described as follows.

First of all, assume that there exist $N_T$ number of transmitting antenna and $N_R$ number of receiving antenna as shown in FIG. 6.

First of all, if we look into a transmission signal, since the maximum number of information capable of being transmitted is $N_T$ in case that there exists $N_T$ number of transmitting antenna, transmission information can be represented as a vector as follows.

$$s = [s_1, s_2, \ldots, s_{N_T}]^T$$ [Formula 2]

Meanwhile, for each of the transmission informations $s_1, s_2, \ldots, s_{N_T}$, a transmit power may be differentiated according to the each of the transmission informations. In this case, if each of the transmit powers is represented as $P_1, P_2, \ldots, P_{N_T}$, transmit power-adjusted transmission information can be represented as a vector as follows.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T$$ [Formula 3]

And, if ŝ is represented using a diagonal matrix P, it can be represented as follows.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Formula 4]}$$

Meanwhile, the $N_T$ number of transmission signal $x_1, x_2, \ldots, x_{N_T}$, which is practically transmitted, is configured in a manner of applying a weighted matrix W to the transmit power adjusted information vector ŝ. In this case, the weighted matrix performs a role of distributing the transmission information to each of the antennas according to the situation of the transmission channel and the like. The transmission signal $x_1, x_2, \ldots, x_{N_T}$ can be represented using a vector X as follows.

$$x = \begin{bmatrix} x_1 \\ x_2 \\ \vdots \\ x_i \\ \vdots \\ x_{N_T} \end{bmatrix} \quad \text{[Formula 5]}$$

$$= \begin{bmatrix} w_{11} & w_{12} & \ldots & w_{1N_T} \\ w_{21} & w_{22} & \ldots & w_{2N_T} \\ \vdots & & \ddots & \\ w_{i1} & w_{i2} & \ldots & w_{iN_T} \\ \vdots & & & \ddots \\ w_{N_T1} & w_{N_T2} & \ldots & w_{N_TN_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix}$$

$$= W\hat{s}$$

$$= WPs$$

In this case, means $W_{ij}$ weighting between an $i^{th}$ transmitting antenna and $j^{th}$ transmission information. The W is called the weighted matrix or a precoding matrix.

Meanwhile, the aforementioned transmission signal (x) can be considered in a manner of dividing into a case of using the spatial diversity and a case of using the spatial multiplexing.

In case of using the spatial multiplexing, since the signals different from each other are transmitted in a manner of being multiplexed, elements of the information vector S have a value different from each other. On the contrary, in case of using the spatial diversity, since an identical signal is transmitted via a plurality of channel paths, the elements of the information vector S have a same value.

Of course, it is possible to consider a method of combining the spatial multiplexing and the spatial diversity. In particular, for instance, a case that an identical signal is transmitted via 3 transmitting antennas using the spatial diversity and the rest of antennas transmit the signals different from each other using the spatial multiplexing can be considered as well.

In case that there exist $N_R$ number of receiving antenna, a reception signal of each antenna $y_1, y_2, \ldots, y_{NR}$ can be represents as a vector y as follows.

$$y = [y_1, y_2, \ldots, y_{N_R}]^T \quad \text{[Formula 6]}$$

Meanwhile, in case of modeling a channel in a MIMO antenna communication system, each channel can be distinguished according to an index of transmitting/receiving antenna. A channel passing through a transmitting antenna j and a receiving antenna i is represented as a N. In this case, be cautious that the index of a receiving antenna is preceding and the index of a transmitting antenna is following in the order of the index of $h_{ij}$.

These channels can be represented as a vector or a matrix in a manner of binding a plurality of channels together. An example of representing a vector is described as follows.

Figure 7:
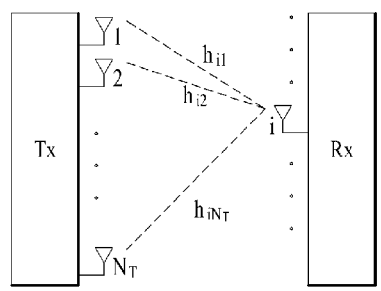
FIG. 7 is a diagram for channels from $N_T$ transmitting antenna to a receiving antenna i.

FIG. 7 is a diagram for channels from $N_T$ transmitting antenna to a receiving antenna i.

As shown in FIG. 7, channels starting from a total $N_T$ number of transmitting antenna to a receiving antenna i can be represented as follows.

$$h_i^T = [h_{i1}, h_{i2}, \ldots, h_{iN_T}] \quad \text{[Formula 7]}$$

And, in case that channels passing through $N_T$ number of transmitting antenna and $N_R$ number of receiving antenna are represented by a matrix form such as the Formula 7, it can be represented as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & & \ddots \\ h_{N_R1} & h_{N_R2} & \ldots & h_{N_RN_T} \end{bmatrix} \quad \text{[Formula 8]}$$

Meanwhile, since an Additive White Gaussian Noise (AWGN) is added to a practical channel after the channel passes through the channel matrix H, the Additive White Gaussian Noise $n_1, n_2, \ldots, n_R$ added to each of the $N_R$ number of receiving antenna can be represented as follows.

$$n = [n_1, n_2, \ldots, n_{N_R}]^T \quad \text{[Formula 9]}$$

By modeling the aforementioned transmission signal, the reception signal, the channel, and the Additive White Gaussian Noise, each of the transmission signal, the reception signal, the channel, and the Additive White Gaussian Noise in a MIMO antenna communication system can be represented via a relationship as follows.

$$y = \begin{bmatrix} y_1 \\ y_2 \\ \vdots \\ y_i \\ \vdots \\ y_{N_R} \end{bmatrix} \quad \text{[Formula 10]}$$

$$= \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & & \ddots \\ h_{N_R1} & h_{N_R2} & \ldots & h_{N_RN_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix}$$

$$= Hx + n$$

Meanwhile, the number of row and column of the channel matrix H, which indicate a state of a channel, is determined by the number of transmitting and receiving antenna. As mentioned in the foregoing description, in the channel matrix H, the number of column becomes identical to the number of receiving antenna $N_R$ and the number of row becomes identical to the number of transmitting antenna $N_T$. In particular, the channel matrix H becomes $N_R*N_T$ matrix.

In general, a rank of a matrix is defined by a minimum number of the numbers of row or column independent from each other. Hence, the rank of the matrix is configured not to be greater than the number of the row or the column. For instance, the rank of a channel matrix H (rank (H)) is limited as follows.

$$\text{rank}(H) \leq \min(N_T, N_R) \qquad \text{[Formula 11]}$$

In particular, when Eigen value decomposition is performed on a matrix, a rank can be defined by the number of Eigen values, which is not a '0' among the Eigen values. Similarly, a rank can be defined by the number of singular values, which is not '0' when SVD (singular value decomposition) is performed on the matrix. Hence, a physical meaning of a rank of a channel matrix may indicate a maximum number capable of transmitting different information from each other in a given channel.

In the present specification, a 'rank' for MIMO transmission indicates the number of path capable of independently transmitting a signal on a specific timing point and a specific frequency resource. 'The number of layer' indicates the number of signal stream transmitted via each path. In general, since a transmitting end transmits layers in response to the number of rank used for transmitting a signal, the rank may have a same meaning with the number of layer unless there is a special comment.

Reference Signal (RS)

Since data is transmitted via a radio channel in a wireless communication system, a signal can be distorted in the midst of being transmitted. In order for a receiving end to receive the distorted signal properly, distortion of the received signal should be calibrated. In order to detect channel information, a signal transmission method known to both a transmitting side and a receiving side and a method of detecting channel information using an extent of distortion when a signal is transmitted via a channel are mainly used. The aforementioned signal is called a pilot signal or a reference signal.

In case of transmitting and receiving data using a MIMO antenna, a channel state between a transmitting antenna and a receiving antenna should be detected to precisely receive a signal. Hence, each of the transmitting antennas should have an individual reference signal.

DL reference signal is classified into a common reference signal (CRS) for all user equipments in a cell and a dedicated reference signal (DRS) for a specific user equipment. Information necessary for performing demodulation and channel measurement can be provided using the reference signals.

A receiving side (i.e., a user equipment) measures a channel state from a CRS and feedbacks such a channel quality-related indicator as a CQI (channel quality indicator), a PMI (precoding matrix index), and/or an RI (rank indicator) to a transmitting side (i.e., a base station). The CRS is also called a cell-specific reference signal. On the contrary, such a reference signal related to the feedback of channel state information (CSI) as CQI/PMI/RI can be defined as a CSI-RS.

The DRS can be transmitted via resource elements in case that data demodulation is required on PDSCH. A user equipment may be able to receive whether the DRS exists via an upper layer and it is valid when a corresponding PDSCH is mapped only. The DRS can be called a user equipment-specific reference signal (UE-specific RS) or a demodulation reference signal (DMRS).

FIG. 8 is a diagram for a reference signal pattern mapped to a downlink resource block (RB) pair defined by 3GPP LTE system. The downlink resource block pair as a unit of mapping a reference signal can be represented as one subframe in time domain*12 subcarriers in frequency domain. In particular, one resource block pair on a time axis (x axis) has a length of 14 OFDM symbols in case of a normal cyclic prefix (normal CP) (FIG. 8(a)) and has a length of 12 OFDM symbols in case of an extended cyclic prefix (extended CP) (FIG. 8(b)). Resource elements (Res) written in a resource block grid as '0', '1', '2', and '3' means CRS position of antenna port index '0', '1', '2', and '3', respectively. The resource elements written as 'D' mean the position of DRS.

In the following description, CRS is explained in more detail. The CRS is used to estimate a channel of a physical antenna and distributed to a whole frequency band as a reference signal capable of being commonly received by all user equipments situated within a cell. And, the CRS can be used for channel quality information (CSI) and a data demodulation.

The CRS is defined by various formats according to antenna arrangement of a transmitting side (base station). 3GPP LTE system (e.g., release-8) supports various antenna arrangements. DL signal transmitting side includes 3 kinds of antenna arrangement such as 3 single transmitting antennas, 2 transmitting antennas, and 4 transmitting antennas. In case that a base station uses a single transmitting antenna, a reference signal for a single antenna port is arranged. In case that the base station uses 2 transmitting antennas, the reference signal for 2 transmitting antennas ports is arranged using a time division multiplexing (TDM) scheme and/or a frequency division multiplexing (FDM) scheme. In particular, different time resources and/or different frequency resources are allocated to the reference signal for the 2 antennas ports to distinguish each of the reference signals. Moreover, in case that the base station uses 4 transmitting antennas, the reference signal for 4 transmitting antennas ports is arranged using the TDM scheme and/or the FDM scheme. Channel information measured by a DL signal receiving side (user equipment) can be used to demodulate the data transmitted using such a transmission scheme as a single transmitting antenna transmission, a transmission diversity, a closed-loop spatial multiplexing, an open-loop spatial multiplexing, or a multi-user MIMO.

In case that a MIMO antenna is supported, when a reference signal is transmitted from a specific antenna port, the reference signal is transmitted to the position of resource elements specified according to a reference signal pattern and is not transmitted to the position of resource elements specified for a different antenna port. In particular, reference signals between antennas different from each other do not overlap with each other.

A rule of mapping CRC to a resource block is defined as follows.

$$\begin{aligned} &k = 6m + (v + v_{shift}) \bmod 6 \qquad \text{[Formula 12]}\\ &l = \begin{cases} 0, & N_{symb}^{DL} - 3 \quad \text{if } p \in \{0, 1\}\\ 1 & \text{if } p \in \{2, 3\} \end{cases}\\ &m = 0, 1, \ldots, 2 \cdot N_{RB}^{DL} - 1\\ &m' = m + N_{RB}^{max,DL} - N_{RB}^{DL} \end{aligned}$$

-continued $$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases}$$

$$v_{shift} = N_{ID}^{cell} \bmod 6$$

In formula 12, k and l indicate a subcarrier index and a symbol index, respectively. P indicates an antenna port. $N_{symb}^{DL}$ indicates the number of OFDM symbol in one DL slot and $N_{RB}^{DL}$ indicates the number of radio resource allocated to a downlink. $n_s$ indicates a slot index and $N_{ID}^{cell}$ indicates a cell ID. A mod indicates a modulo calculation. A position of the reference signal varies according to a $V_{shift}$ value in frequency domain. Since the $V_{shift}$ is subordinate to the cell ID, the position of the reference signal may have various frequency shift values according to a cell.

More specifically, in order to enhance channel estimation performance via the CRS, the position of the CRS can be shifted in frequency domain according to a cell. For instance, in case that a reference signal is positioned with interval of 3 subcarriers, reference signals in one cell are assigned to a $3k^{th}$ subcarrier and the reference signal in a different cell is assigned to a $(3k+1)^{th}$ subcarrier. In a single antenna port point of view, reference signals are arranged with interval of 6 resource elements in frequency domain and separated from the reference signal assigned to a different antenna port with interval of 3 resource elements.

The reference signal in time domain is arranged starting from symbol index 0 of each slot with a constant interval. Time interval is differently defined according to a length of a cyclic prefix. In case of a normal cyclic prefix, the reference signal is positioned at the symbol index 0 and 4 of a slot. In case of an extended prefix, the reference signal is positioned at the symbol index 0 and 3 of a slot. The reference signal, which is required for the antenna port having a maximum value among the 2 antenna ports, is defined within an OFDM symbol. Hence, in case of 4 transmitting antennas transmission, the reference signal for the reference signal antenna port 0 and 1 is positioned at the symbol index 0 and 4 of a slot (in case of extended prefix, symbol index 0 and 3) and the reference signal for the reference signal antenna port 2 and 3 is positioned at the symbol index 1 of a slot. The position of the reference signal for the antenna port 2 and 3 in frequency domain is exchanged with each other in a second slot.

In the following description, DRS is explained in more detail. The DRS is used to demodulate data. In MIMO antenna transmission, a precoding weighted value used for a specific user equipment is used without a change to estimate a channel, which corresponds to the transmission channel transmitted from each transmitting antenna in a manner of being combined.

3GPP LTE system (e.g., release-8) supports maximum 4 transmitting antennas and defines the DRS for a rank 1 beamforming. The DRS for the rank 1 beamforming indicates a reference signal for an antenna port index 5 as well.

A rule of mapping DRS to a resource block is defined as follows. Formula 13 indicates a case of a normal cyclic prefix and Formula 14 indicates a case of an extended cyclic prefix.

$$k = (k') \bmod N_{sc}^{RB} + N_{sc}^{RB} \cdot n_{PRB} \quad \text{[Formula 13]}$$

$$k' = \begin{cases} 4m' + v_{shift} & \text{if } l \in \{2, 3\} \\ 4m' + (2 + v_{shift}) \bmod 4 & \text{if } l \in \{5, 6\} \end{cases}$$

$$l = \begin{cases} 3 & l' = 0 \\ 6 & l' = 1 \\ 2 & l' = 2 \\ 5 & l' = 3 \end{cases}$$

$$l' = \begin{cases} 0, 1 & \text{if } n_s \bmod 2 = 0 \\ 2, 3 & \text{if } n_s \bmod 2 = 1 \end{cases}$$

$$m' = 0, 1, \ldots, 3N_{RB}^{PDSCH} - 1$$

$$v_{shift} = N_{ID}^{cell} \bmod 3$$

$$k = (k') \bmod N_{sc}^{RB} + N_{sc}^{RB} \cdot n_{PRB} \quad \text{[Formula 14]}$$

$$k' = \begin{cases} 3m' + v_{shift} & \text{if } l = 4 \\ 3m' + (2 + v_{shift}) \bmod 3 & \text{if } l = 1 \end{cases}$$

$$l = \begin{cases} 4 & l' \in \{0, 2\} \\ 1 & l' = 1 \end{cases}$$

$$l' = \begin{cases} 0 & \text{if } n_s \bmod 2 = 0 \\ 1, 2 & \text{if } n_s \bmod 2 = 1 \end{cases}$$

$$m' = 0, 1, \ldots, 4N_{RB}^{PDSCH} - 1$$

$$v_{shift} = N_{ID}^{cell} \bmod 3$$

In the Formula 8 to Formula 10, k and p indicate a subcarrier index and an antenna port, respectively. $N_{RB}^{DL}$, $n_s$, and $N_{cell}^{ID}$ indicate the number of RBs allocated to a downlink, the number of slot index, and the number of cell ID, respectively. A position of the RS varies according to a value of $V_{shift}$ in the frequency domain point of view.

In Formula 13 and 14, k and l indicate a subcarrier index and a symbol index, respectively. P indicates an antenna port. $N_{SC}^{RB}$ indicates a size of a resource block in frequency domain and is represented as the number of subcarrier. $n_{PRB}$ indicates the number of physical resource block. $N_{RB}^{PDSCH}$ indicates a frequency band of a resource block for a PDSCH transmission. $n_s$ indicates a slot index and $N_{ID}^{cell}$ indicates a cell ID. mod indicates a modulo calculation. A position of the reference signal varies according to a $V_{shift}$ value in frequency domain. Since the $V_{shift}$ is subordinate to the cell ID, the position of the reference signal may have various frequency shift values according to a cell.

Coordinated Multi-Point (CoMP) system

To keep up with a request of LTE-advanced, a coordinated multi-point (hereinafter abbreviated CoMP) transmission is proposed to enhance system performance. The CoMP is also called a co-MIMO, a collaborative MIMO, a network MIMO, and the like. It is anticipated that the CoMP enhances the performance of a user equipment situated at a cell boundary and increases the throughput of an average cell (sector).

In general, inter-cell interference decreases the performance of a user equipment situated at a cell boundary and the throughput of an average cell (sector) in a multi-cell environment, which frequency reuse index corresponds to 1. In order to reduce the inter-cell interference, LTE system adopted a simple and passive method such as a fractional frequency reuse for a user equipment situated at a cell boundary to have a reasonable performance efficiency in an interference-limited environment. Yet, instead of reducing the use of frequency resource per each cell, a method of reusing the inter-cell interference or reducing the inter-cell interference with a signal (desired signal), which should be received by a user equipment, is more profitable. In order to achieve the aforementioned purpose, the CoMP transmission scheme can be applied.

The CoMP scheme applicable to a downlink can be classified into a JP (joint processing) scheme and a CS/CB (coordinated scheduling/beamforming) scheme.

According to the JP scheme, data can be used in each point (base station) of CoMP unit. The CoMP unit means an aggregation of base stations used by the CoMP scheme. The JP scheme can be classified into a joint transmission scheme and a dynamic cell selection scheme again.

The joint transmission scheme means a scheme that signals are simultaneously transmitted on PDSCH from a plurality of points, which corresponds to a whole or a part of the CoMP unit. In particular, data transmitted to single user equipment can be simultaneously transmitted from a plurality of the transmission points. By using the joint transmission scheme, quality of a signal transmitted to a user equipment can be enhanced irrespective of a coherent signal or a non-coherent signal and may be able to actively eliminate the interference with a different user equipment.

The dynamic cell selection scheme means a scheme that a signal is transmitted on PDSCH from a single point. In particular, data transmitted to single user equipment on a specific time is transmitted from a single point and different points in the CoMP unit do not transmit data to the user equipment. The point transmitting the data to the user equipment can be dynamically selected.

According to the CS/CB scheme, the CoMP unit performs a beamforming in a manner of cooperating for a data transmission to the single user equipment. In particular, although the data is transmitted to the user equipment by a serving cell only, a user scheduling/beamforming can be determined by the cooperation of a plurality of the cells in the CoMP unit.

In case of UL, CoMP reception means to receive a signal transmitted by the cooperation of a plurality of the points by which geographically separated. The CoMP scheme applicable to the UL can be classified into a JR joint reception) scheme and a CS/CB (coordinated scheduling/beamforming) scheme.

The JR scheme means a scheme receiving signals transmitted on PDSCH by a plurality of points, which corresponds to a whole or a part of the CoMP unit. According to the CS/CB scheme, although a signal transmitted on PDSCH is received by a single point only, a user scheduling/beamforming can be determined by the cooperation of a plurality of the cells in the CoMP unit.

Sounding Reference Signal (SRS)

SRS is mainly used for a channel measurement to perform a frequency-selective scheduling of UL. The SRS is not related to a transmission of UL data and/or control information. Yet, the SRS may be non-limited to this and can be used for various different purposes to enhance power control or support various start-up functions of user equipments, which is not currently scheduled. As one example of the start-up functions may include an initial modulation and coding scheme (MCS), an initial power control for a data transmission, timing advance, and a frequency semi-selective scheduling. In this case, the frequency semi-selective scheduling indicates a scheduling that a frequency resource is selectively allocated to a first slot of a subframe and the frequency resource is allocated to a second slot in a manner of pseudo-randomly hopping to a different frequency.

And, the SRS can be used to measure a DL channel quality under an assumption that a radio channel between an UL and a DL is reciprocal. This assumption is considerably effective in a time division duplex (TDD) system that the UL and the DL share an identical frequency spectrum and separated in time domain.

Subframes of the SRS transmitted by a certain user equipment in a cell can be represented by a cell-specific broadcasting signal. 4-bits cell-specific parameter 'srsSubframeConfiguration' indicates 15 available subframe arrangements capable of transmitting the SRS via each radio frame. Fluidity for coordination of an SRS overhead is provided according to a deployment scenario by the arrangements. A $16^{th}$ arrangement among the arrangements completely turns off a switch of the SRS in a cell. The $16^{th}$ arrangement is suitable for a serving cell mainly serving fast user equipments.

Figure 9:
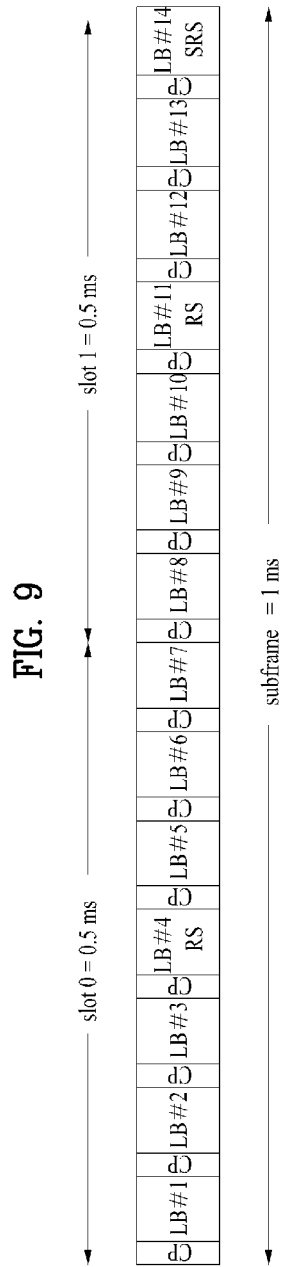
FIG. 9 indicates an uplink subframe including an SRS symbol.

FIG. 9 indicates an uplink subframe including an SRS symbol.

Referring to FIG. 9, the SRS is always transmitted via the last SC-FDMA symbol in an arranged subframe. Hence, the SRS and DMRS are positioned at a different SC-FDMA symbol. PUSCH data transmission is not permitted in a specific SC-FDMA symbol, which is required for the SRS transmission. Consequently, in case that a sounding overhead is highest, in particular, even in case that a SRS symbol is included in all subframes, the sounding overhead is not over about 7%.

Each SRS symbol is generated by a basic sequence (a sequence set based on a random sequence or Zadoff-Ch (ZC)) for a given time unit and a frequency band. All user equipments situated at a same cell use a same basic sequence. In this case, SRS transmission from a plurality of user equipments in a same cell in a same time/frequency domain can be distinguished in a manner of being orthogonally crossed by a different cyclic shift of the basic sequence. By assigning a different basic sequence to each cell, SRS sequence from the cells different with each other can be distinguished. Yet, orthogonality between the basic sequences different from each other is not secured.

Relay Node (RN)

Figure 1:
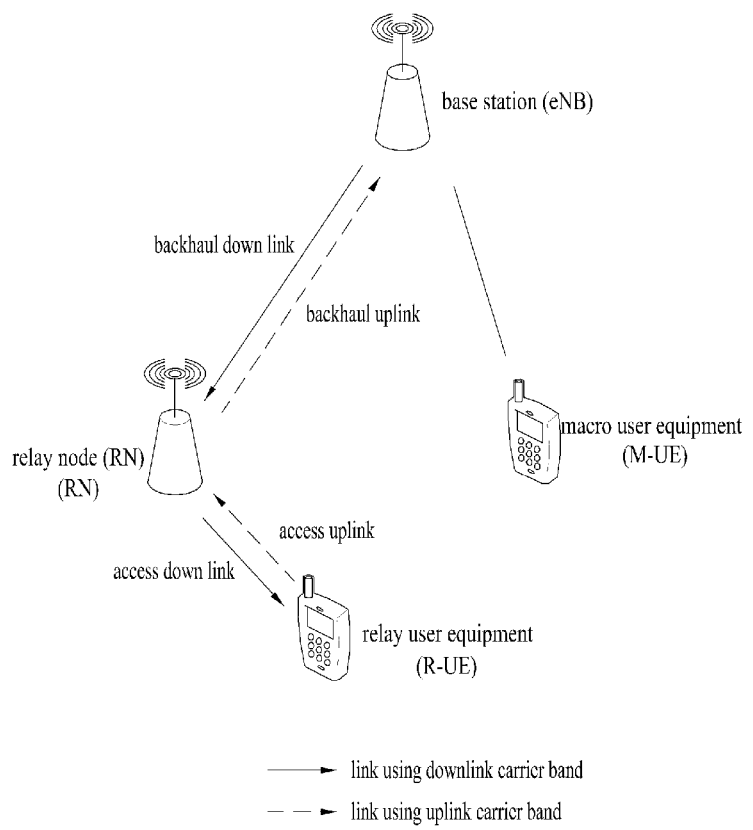
FIG. 1 indicates an example of a wireless communication system including a relay node.

Referring to FIG. 1 again, a relay node delivers the data transceived between a base station and a user equipment via two different links (a backhaul link and an access link). The relay may be able to include a donor cell. the relay node is wirelessly connected to a wireless access network via the donor cell.

Meanwhile, regarding a band (or spectrum) use of a relay node, one case in which a backhaul link operates on the same frequency band of an access link may be referred to as 'in-band', and the other case in which a backhaul link operates on a frequency band different from that of an access link is referred to as 'out-band'. In both of the above-mentioned two cases of the in-band and the out-band, it is necessary for a user equipment (hereinafter, a legacy user equipment) operating in a legacy LTE system (e.g., Release-8) to access a donor cell.

Relay nodes may be classified into a transparent relay node and a non-transparent relay node by depending on whether a user equipment recognizes the relay node. In particular, the 'transparent' may mean a case that a user equipment is unable to recognize whether the user equipment is communicating with a network via the relay node. And, the 'non-transparent' may mean a case that the user equipment is able to recognize whether the user equipment is communicating with the network via the relay node.

Regarding controls of a relay node, relay nodes may be classified into the relay node configured as a part of a donor cell and the relay node capable of controlling a cell by itself.

Although the relay node configured as a part of the donor cell may have a relay node identity (ID), the relay node does not have a cell identity of its own. If at least one part of RRM (Radio Resource Management) is controlled by a base station having the donor cell belong thereto, despite that the rest of the RRM is located at the relay node, the above-mentioned relay node may be considered as a relay node configured as a part of the donor cell. Preferably, this relay node may be able to support a legacy user equipment. For example, smart repeaters, decode-and-forward relay nodes, a variety of L2 (second layer) relay nodes, and a type-2 relay node may belong to the category of the above-mentioned relay node.

Regarding a relay node configured to control a cell by itself, this relay node controls one or a plurality of cells and a unique physical layer cell identifier is provided to each cell controlled by the relay node. And, the same RRM mechanism may be usable. In aspect of a user equipment, there is no difference between accessing a cell controlled by the relay node and accessing a cell controlled by a general base station. The cell controlled by the above-mentioned relay node may be able to support a legacy user equipment. For example, a self-backhauling relay node, an L3 (3rd layer) relay node, a type-1 relay node, and a type-1a relay node may correspond to the above-mentioned relay node.

The type-1 relay node corresponds to an in-band relay node and controls a plurality of cells. And, a user equipment may consider each of a plurality of the cells as an individual cell discriminated from a donor cell. Moreover, each of a plurality of the cells has a physical cell ID (defined in LTE Release-8) of its own and the relay node may be able to transmit a synchronization channel of the relay node, a reference signal and the like. In case of a single-cell operation, the user equipment may directly receive scheduling information and a HARQ feedback from the relay node and may be able to transmit a control channel (scheduling request (SR), CQI, ACK/NACK, etc.) of the user equipment to the relay node. Moreover, legacy user equipments (e.g., user equipments operating in LTE Release-8 system) may consider the type-1 relay node as a legacy base station (e.g., a base station operating in the LTE Release-8 system). In particular, the type-1 relay node has backward compatibility. Meanwhile, in aspect of user equipments operating in LTE-A system, the type-1 relay node is considered as a base station different from the legacy base station, whereby performance thereof can be provided.

Besides the operation in out-band, the type-1a relay node has the same features of the aforementioned type-1 relay node. The operation of the type-1a relay node can be configured to minimize (or eliminate) the influence on L1 (first layer) operation.

The type-2 relay node corresponds to an in-band relay node but has no separate physical cell ID. Hence, the type-2 relay node does not form a new cell. The type-2 relay node is transparent to a legacy user equipment and the legacy user equipment is unable to recognize the presence of the type-2 relay node. Although the type-2 relay node is able to transmit PDSCH, it may not transmit at least CRS and PDCCH.

Meanwhile, In order for the relay node to operate in in-band, prescribed resources in time-frequency space must be reserved for a backhaul link and these resources may be configured not to be used for an access link. This configuration may be called 'resource partitioning'.

The general principles related to the resource partitioning in a relay node may be described as follows. First of all, a backhaul downlink and an access downlink may be multiplexed together on a single carrier frequency by Time Division Multiplexing (TDM) scheme (i.e., either the backhaul downlink or the access downlink is activated on a specific time.). Similarly, a backhaul uplink and an access uplink may be multiplexed together on a single carrier frequency by TDM scheme (i.e., either the backhaul uplink or the access uplink can be activated on a specific time).

Regarding the backhaul link multiplexing by the FDD, a backhaul downlink transmission can be performed on a downlink frequency band, and a backhaul uplink transmission can be performed on an uplink frequency band. Regarding the backhaul link multiplexing by the TDD, a backhaul downlink transmission can be performed in a downlink subframe of a base station or a relay node, and a backhaul uplink transmission can be performed in an uplink subframe of the base station or the relay node.

In case of an in-band relay node, for example, provided that both a backhaul downlink reception from a base station and an access downlink transmission to a user equipment are simultaneously performed on a prescribed frequency band, a signal transmitted from a transmitting end of a relay node may be received by a receiving end of the relay node, whereby signal interference or RF jamming may occur at an RF front-end of the relay node. Similarly, if both an access uplink reception from a user equipment and a backhaul uplink transmission to a base station are simultaneously performed on a prescribed frequency band, signal interference may occur at the RF front-end of the relay node.

Therefore, it may be difficult to implement the simultaneous transmission and reception on a single frequency band at a relay node unless a sufficient separation between a received signal and a transmitted signal is provided (e.g., a transmitting antenna and a receiving antenna are installed in a manner of being sufficiently spaced apart from each other (e.g., installed on/under the ground)).

As a solution for the above signal interference problem, it may be able to enable a relay node not to transmit a signal to a user equipment while receiving a signal from a donor cell. In particular, a gap is generated in a transmission from the relay node to the user equipment, and the user equipment (e.g., a legacy user equipment, etc.) may be configured not to expect any transmission from the relay node during this gap. The above-mentioned gap may be generated by constructing MBSFN (Multicast Broadcast Single Frequency Network) subframe.

Figure 10:
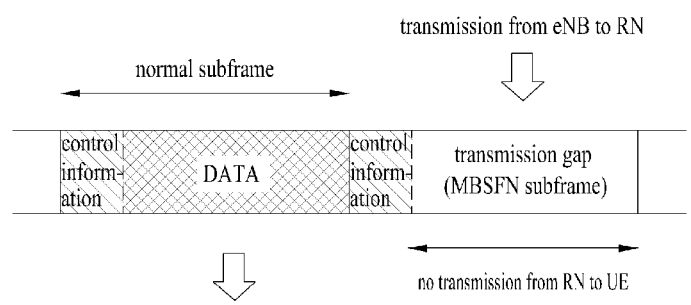
FIG. 10 is a diagram indicating an example of a relay node resource partitioning.

FIG. 10 is a diagram indicating an example of a relay node resource partitioning.

Referring to FIG. 10, a first subframe is a normal subframe and a downlink (i.e., an access down link) control signal and data are transmitted from a relay node to a user equipment. A second subframe is an MBSFN subframe. The control signal is transmitted from the relay node to the user equipment in a control region of the DL subframe. Yet, no transmission is performed from the relay node to the user equipment in the rest of the region of the DL subframe. In this case, since a legacy user equipment is configured to expect a transmission of a physical downlink control channel (PDCCH) in all DL subframes (i.e., since it is necessary for the relay node to support the legacy user equipments within the region of the relay node to perform a measuring function in a manner of receiving the PDCCH on every subframe), it is necessary to transmit the PDCCH in all DL subframes for a correct operation of the legacy user equipment. Hence, even in the subframe configured for the downlink (i.e., backhaul downlink) transmission from the base station to the relay node, it is necessary for the relay node not to receive a backhaul downlink but to perform an access downlink transmission in the first N (N is 1, 2, or 3) number of OFDM symbol interval of the subframe. Regarding this, since the PDCCH is transmitted from the relay node to the user equipment in the control region of the second subframe, backward compatibility for the legacy user equipment serving in the relay node may be provided. In the rest of the region of the second subframe, the relay node may be able to receive a transmission from the base station while no transmission is performed from the relay node to the user equipment. Therefore, by using the resource partitioning, it may enable not to perform the access downlink transmission and the backhaul downlink reception at the same time in an in-band relay node.

The second subframe using an MBSFN subframe is explained in detail. A control region of the second subframe may be called a relay node non-hearing interval. The relay node non-hearing interval means an interval for the relay node to transmit an access downlink signal without receiving a backhaul downlink signal. This interval can be configured by the length of 1, 2, or 3 OFDMs. The relay node performs an access downlink transmission to a user equipment in the relay node non-hearing interval and may be able to receive a backhaul downlink from a base station in the rest of the region. At this time, since the relay node is unable to perform a transmission and reception at the same time on an identical frequency band, it takes time for the relay node to change from a transmitting mode to a receiving mode. Thus, it is necessary to configure a guard time (GT) in order for the relay node to switch from the receiving mode to the transmitting mode in a first prescribed part of the interval of the backhaul downlink receiving region. Similarly, in case that the relay node operates to receive the backhaul link from the base station and to transmit the access downlink to the user equipment, it may be able to configure the guard time (GT) in order for the relay node to switch from the receiving mode to the transmitting mode. The length of the guard time may be given by the value of the time domain. For instance, it may be given by the value of k (k≥1) number of time sample (Ts) or may be configured by the length of one or more OFDM symbols. Or, the guard time of the last part of the subframe may not be defined or configured in case that the relay node backhaul downlink subframe is configured consecutively or according to a prescribed subframe timing alignment relationship. In order to maintain a backward compatibility, the guard time can be defined on the frequency domain configured for the backhaul downlink subframe transmission only (if the guard time is configured in the access downlink interval, a legacy user equipment may not be supported). The relay node may be able to receive PDCCH and PDSCH in the backhaul downlink receiving interval except the guard time. This may be represented as an R-PDCCH (relay-PDCCH) and an R-PDSCH (relay-PDSCH) in a meaning of a relay node dedicated physical channel.

Figure 11:
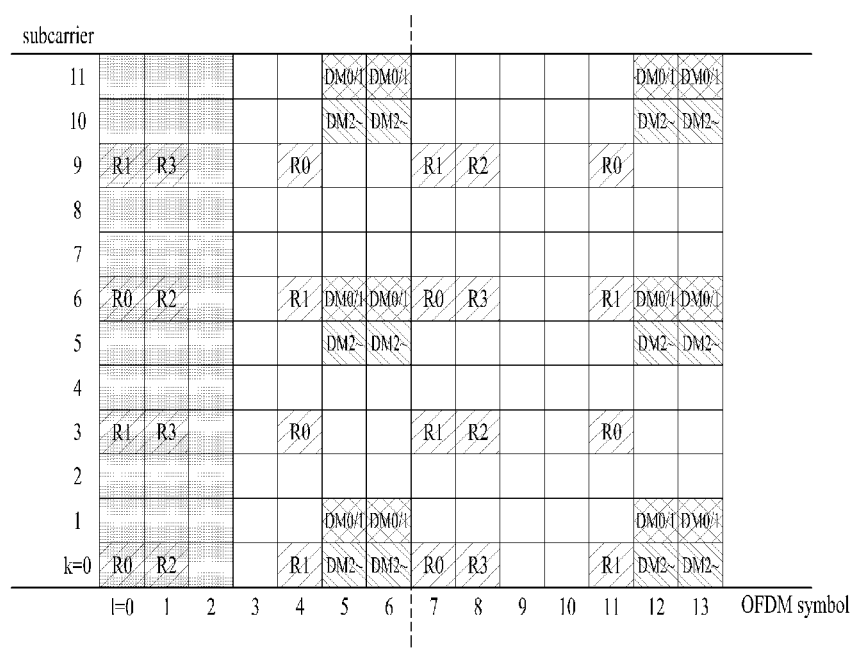
FIG. 11 is a diagram indicating an example of a structure of a demodulation reference signal (DMRS) added by LTE-A system.

FIG. 11 is a diagram indicating an example of a structure of a demodulation reference signal (DMRS) added by LTE-A system. In case of transmitting a signal using a MIMO antenna, the DMRS is a UE-specific reference signal used for demodulating the signal of each layer. The DMRS is used to demodulate a PDSCH and an R (relay)-PDSCH. In LTE-A system, since an antenna port for the DMRS is (7, 8, . . . , n+6) (n is the number of layer), maximum 8 layers and each DMRS for the layers are necessary. For clarity, the DMRS corresponding to each of the layer 0 to 7 (or antenna port 7 to 14) is called DMRS 0 to 7, respectively.

Referring to FIG. 11, the DMRS for more than two layers shares an identical RE and the DMRS is multiplexed according to CDM (code division multiplexing) scheme.

Specifically, if a rank is 1, DMRS 0 is transmitted only. If the rank is 2, DMRS 0 and DMRS 1 are transmitted. In case of the rank 1 or the rank 2, DMRS overhead in a resource block corresponds to 12 resource elements. On the contrary, in case that a rank is 3, DMRS 0, 1, and 2 are transmitted, respectively. In case that the rank is greater the 3, DMRS 0, 1, 2, . . . , 7 are transmitted. In case that the rank is 3 to 8, DMRS overhead in a resource block corresponds to 24 resource elements.

As mentioned in the foregoing description, the DMRS sharing an identical resource element is multiplexed according to the CDM (code division multiplexing) scheme. Specifically, the DMRS for each layer spreads using a spreading code (e.g., Walsh code, orthogonal code such as a DFT code) and then multiplexed on a same resource element. For instance, the DMRS for layer 0 and layer 1 shares an identical resource element and spreads to OFDM symbol 12 and 13 using the orthogonal code in a subcarrier 1 (k=1). In particular, the DMRS for the layer 0 and 1 spreads according to a time axis using a spreading factor (SF)=2 code in each slot and then multiplexed to an identical resource element. For instance, the DMRS for the layer 0 spreads using [+1 +1] and the DMRS for the layer 1 spreads using [+1 −1]. Similarly, the DMRS for the layer 2 and 3 spreads to a same resource element using the orthogonal codes different from each other. The DMRS for the layer 4, 5, 6, and 7 spreads to the resource element occupied by the DMRS 0, 1, 2, and 3 using a code orthogonal to the layer 0, 1, 2, and 3. Up to 4 layers, the SF=2 code is used for the DMRS. In case of using more than 5 layers, an SF=4 code is used for the DMRS.

Table 1 indicates a spreading sequence for antenna port 7 to 14 defined by LTE-A.

TABLE 1

| Antenna port p | $[\overline{w}_p(0)\ \overline{w}_p(1)\ \overline{w}_p(2)\ \overline{w}_p(3)]$ |
| --- | --- |
| 7 | [+1 +1 +1 +1] |
| 8 | [+1 −1 +1 −1] |
| 9 | [+1 +1 +1 +1] |
| 10 | [+1 −1 +1 −1] |
| 11 | [+1 +1 −1 −1] |
| 12 | [−1 −1 +1 +1] |
| 13 | [+1 −1 −1 +1] |
| 14 | [−1 +1 +1 −1] |

Referring to Table 1, the orthogonal code for the antenna port 7 to 10 has a structure of repeating an orthogonal code of length 2. Hence, consequently, the orthogonal code of length 2 is used in a slot level up to 4 layers. In case of using more than 5 layers, it becomes identical to a case that an orthogonal code of length 4 is used in a subframe level.

Meanwhile, a scramble ID (SCID) can be applied to generate a DMRS sequence. A multi-user MIMO (MU-MIMO) technology enables a transmitting end to transmit a signal different from each other to a plurality of receiving ends in a manner of sharing a time and frequency resource and makes interference between signals to the multi-users to be eliminated or reduced in a manner of performing a precoding per each signal. LTE-A system has defined 2 scramble IDs to smoothly operate the MU-MIMO technology. One antenna port specified by the transmitting end can be configured to select one of the 2 scramble IDs. In particular, every antenna can be configured as 0 or 1. In order to distinguish the antenna port, the scramble ID can be configured differently according to each of the antenna ports. Since the DMRS sequence having the scramble ID different from each other in a same antenna port has low cross-correlation characteristics, which is not completely orthogonal though, if the interference with a signal of a different user is reduced by performing a precoding, channel estimation performance can be enhanced more.

In order for a receiving end to use one layer received from a transmitting end, the receiving end should know both the antenna port and the scramble ID of a corresponding layer. In particular, since a relay node demodulates a received signal in a manner of using the DMRS and the scramble ID corresponding to the layer (or antenna port), the relay node should know the antenna port to use the corresponding DMRS.

The antenna port and the scramble ID of the transmitting end can be determined in advance according to the receiving end. Since R-PDCCH is a control channel, since a separate channel capable of informing the information to be used for a channel estimation of the R-PDCCH is not determined. For instance, the antenna port and the scramble ID used for demodulating the R-PDCCH can be determined in advance like 7 and 0, respectively. And, the antenna port and the scramble ID to be used can be delivered to the relay node from a base station in advance via an upper layer signal such as an RRC (radio resource control) signal. The base station may be able to deliver a layer index, an antenna port, and a scramble ID to the receiving end, i.e., the relay node via a DCI format configured for a DL transmission scheduling.

Table 2 indicates a DCI format to configure an antenna port, a scramble ID, and a layer index defined by LTE-A.

TABLE 2

| One Codeword: Codeword 0 enabled, Codeword 1 disabled | | Two Codewords: Codeword 0 enabled, Codeword 1 enabled | |
| --- | --- | --- | --- |
| Value | Message | Value | Message |
| 0 | 1 layer, port 7, $n_{SCID}$ = 0 | 0 | 2 layers, ports 7-8, $n_{SCID}$ = 0 |
| 1 | 1 layer, port 7, $n_{SCID}$ = 1 | 1 | 2 layers, ports 7-8, $n_{SCID}$ = 1 |
| 2 | 1 layer, port 8, $n_{SCID}$ = 0 | 2 | 3 layers, ports 7-9 |
| 3 | 1 layer, port 8, $n_{SCID}$ = 1 | 3 | 4 layers, ports 7-10 |
| 4 | 2 layers, ports 7-8 | 4 | 5 layers, ports 7-11 |
| 5 | 3 layers, ports 7-9 | 5 | 6 layers, ports 7-12 |
| 6 | 4 layers, ports 7-10 | 6 | 7 layers, ports 7-13 |
| 7 | Reserved | 7 | 8 layers, ports 7-14 |

Referring to Table 2, $n_{SCID}$ indicates a scramble ID value. A base station may be able to differently configure a layer index, an antenna port, and a scramble ID of each relay node in a manner of changing a value of the DCI format.

As mentioned in the foregoing description, a relay node demodulates an R-PDCCH using the antenna port and the scrambled ID, which is configured in advance or delivered via an upper layer signal. PDSCH is also modulated identically using the antenna port and the scramble ID used for modulating the R-PDCCH. In this case, it may be difficult to perform a multi-user MIMO (MU-MIMO) antenna operation. More specifically, in case of transmitting a signal different from each other from a transmitting end to a plurality of receiving ends, the multi-user MIMO (MU-MIMO) antenna system may be able to share an identical time and frequency resource. In particular, an identical time and frequency resource can be allocated for the PDSCH transmission. As mentioned in the above, if the antenna port and the scramble ID are determined in advance for the R-PDCCH demodulation, each relay node demodulates each of the PDSCHs using the antenna port and the scramble ID configured for the R-PDSSC modulation in the same manner. In this case, if the antenna port and the scramble ID configured for the relay node different from each other are identical, each relay node demodulates each of the received PDSCHs using the identical antenna port and the scramble ID and then the relay node may not be able to distinguish the PDSCH transmitted to the relay node. Following description is explained in detail with reference to the drawings.

Figure 12:
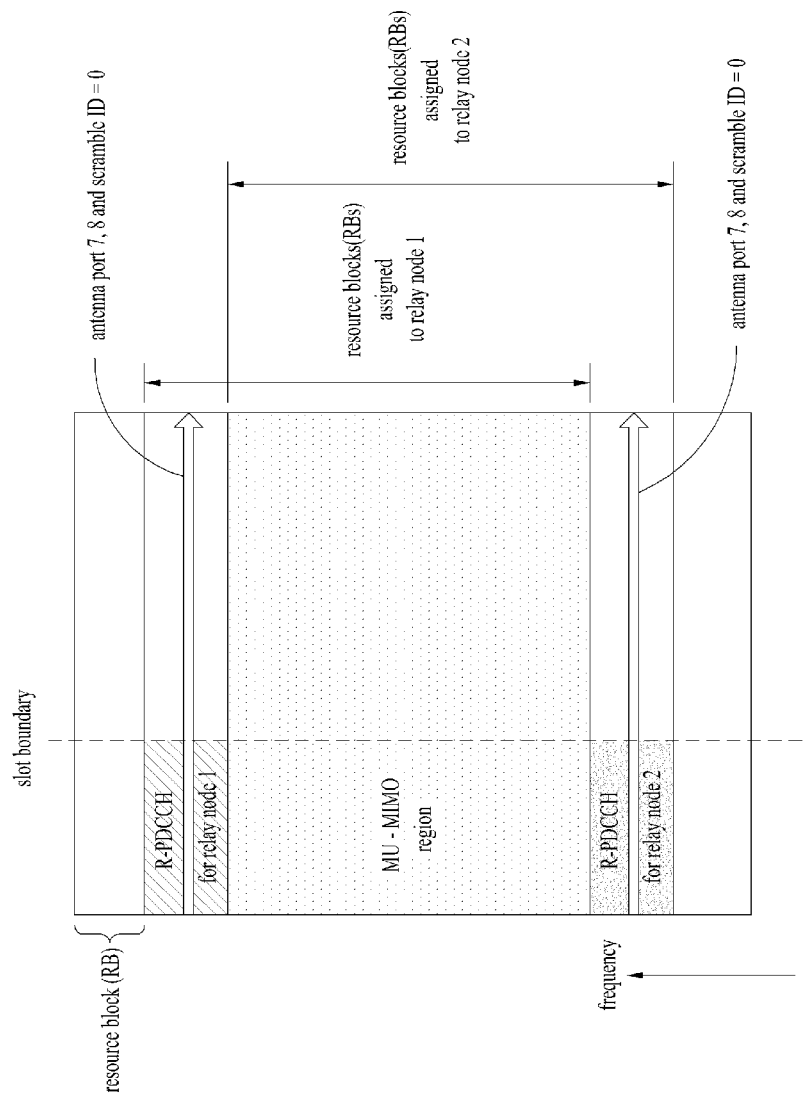
FIG. 12 is a diagram for an example of radio resource blocks received by a relay node different from each other.

FIG. 12 is a diagram for an example of radio resource blocks received by a relay node different from each other.

Referring to FIG. 12, a base station transmits an R-PDCCH including a control information and a PDSCH including a data to a relay node 1 and a relay node 2, respectively. In particular, the base station transmits the PDSCH in a frequency and time region of a radio resource block except the region to which the R-PDCCH is allocated.

In this case, a part of the region among the resource block transmitted to the relay node 1 and the resource block transmitted to the relay node 2 may be able to share an identical time and frequency resource with each other. In particular, the relay node 1 and the relay node 2 receive a signal including information different from each other from a transmitting end (e.g., base station). A specific region, which is a part of the resource region to which each signal is assigned, can be allocated with an identical frequency-time resource. For clarity, the specific region is called an MU-MIMO region.

As mentioned earlier, the relay node 1 and the relay node 2 should know both the antenna port and the scramble ID of the transmitting end for a transmission signal in order to demodulate the signals received from each of the transmitting ends. For clarity, assume that the antenna ports of the transmitting end for a control signal transmitted to the relay node 1 and the relay node 2 are determined as 7, 8 and the scramble ID is determined as 0.

Both of the relay node 1 and the relay node 2 demodulate the control signal received using the DMRS and the scramble ID 0, which corresponds to the pre-set antenna port 7, 8. Meanwhile, it is preferable that the DMRS of the relay node 1 and the relay node 2 transmitted from a physical resource block pair (PBR pair) identical to the control signal uses the scramble ID identical to the control signal. This is because, if the scramble ID is different, orthogonality is not maintained, interference occurs between the DMRSs, and then channel estimation performance is degraded. As a result, the relay node 1 and the relay node 2 uses the antenna port 7, 8 and the scramble ID 0 to demodulate a signal received in the MU-MIMO region sharing an identical time and frequency resource as well. In this case, if an identical antenna port and a scramble ID are configured to a plurality of receiving ends and if a signal is received by each of a plurality of the receiving ends from the transmitting end in an identical frequency-time resource region, each of the receiving ends may not be able to distinguish the signal transmitted to the each of the receiving ends. In particular, a problem that the MU-MIMO becomes unavailable may occur.

In the following description, a method of configuring an antenna port and/or a scramble ID different from each other to a relay node different from each other via an R-PDCCH is proposed.

Figure 13:
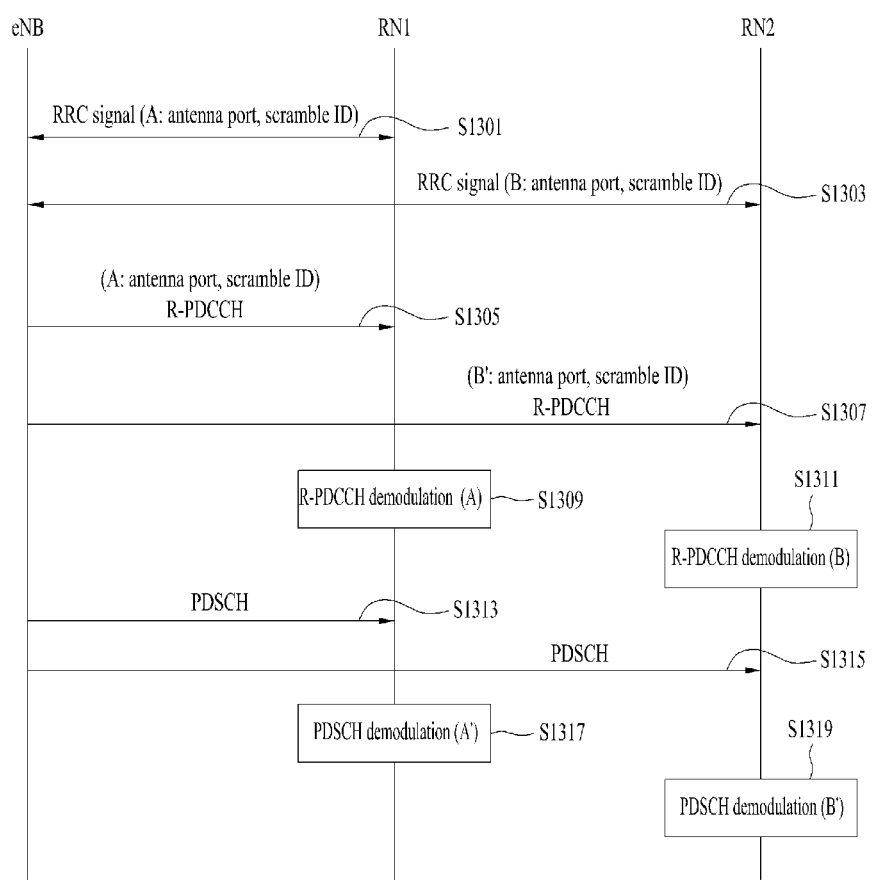
FIG. 13 is a flowchart indicating a method for a base station to configure a scramble ID and/or an antenna port to a relay node according to one embodiment of the present invention.

FIG. 13 is a flowchart indicating a method for a base station to configure a scramble ID and/or an antenna port to a relay node according to one embodiment of the present invention.

Referring to FIG. 13, a base station transmits antenna port information and a scramble ID to a relay node 1 (or a first node) via an upper layer signaling (e.g., RRC signal) [S1301]. And, the base station may be able to transmit the antenna port information and the scramble ID to a relay node 2 (or a second node) via the upper layer signaling (RRC signal) [S1303]. In this case, a sequence of transmitting the antenna port information and the scramble ID to the relay node 1 and 2 by the base station can be simultaneously performed and the antenna port information and the scramble ID can be transmitted to the relay node 2 first.

And, the steps of S1301 and S1303 may not be performed. In this case, the antenna port information and the scramble ID for transmitting and receiving an R-PDCCH may be configured in advance on a system.

For clarity, the antenna port information and the scramble ID transmitted to the relay node 1 by the base station via the RRC signal is called (A) and the antenna port information and the scramble ID transmitted to the relay node 2 by the base station via the RRC signal is called (B) in the following description. In this case, the (A) and the (B) may be identical or different from each other. In case that the (A) and the (B) are different from each other, either the antenna port information or the scramble ID may be different or both of the antenna port information and the scramble ID may be different.

The base station transmits the R-PDCCH including DL scheduling information and resource allocation information to the relay node 1 and 2, respectively [S1305, S1307]. In this case, the R-PDCCH to which transmitted to the relay node 1 and 2 may include the antenna port information and the scramble ID for transmitting a PDSCH and only the R-PDCCH transmitted to a prescribed relay node may include the antenna port information and the scramble ID. And, the R-PDCCH transmitted to the relay node 1 or 2 may include either the antenna port information or the scramble ID only. In the following description, assume that the R-PDCCH transmitted to the relay node 1 and 2 includes both the antenna port information and the scramble ID.

In the steps of S1305 and S1307, a sequence of transmitting the R-PDCCH to the relay node 1 and 2 by the base station can be simultaneously performed and the R-PDCCH can be transmitted to the relay node 2 first.

For clarity, the antenna port information and the scramble ID transmitted to the relay node 1 by the base station via the R-PDCCH for transmitting the PDSCH is called (A') and the antenna port information and the scramble ID transmitted to the relay node 2 by the base station via the R-PDCCH for transmitting the PDSCH is called (B') in the following description. In this case, the (A') and the (B') may be identical or different from each other. In case that the (A') and the (B') are different from each other, either the antenna port information or the scramble ID may be different or both of the antenna port information and the scramble ID may be different. Moreover, the (A) and the (A') may be identical or different from each other. And, the (B) and the (B') may be identical or different from each other. In case of being different from each other, either the antenna port information or the scramble ID may be different or both of the antenna port information and the scramble ID may be different.

The relay node 1 and 2 demodulates the R-PDCCH using the pre-set antenna port information and the scramble ID or the antenna port information and the scramble ID received via the upper layer signaling (RRC signal) and checks the antenna port information and the scramble ID information for transmitting the PDSCH included in the R-PDCCH [S1309, S1311]. In particular, the relay node 1 demodulates the R-PDCCH using the (A) and the relay node 2 demodulates the R-PDCCH using the (B).

The base station transmits the PDSCH including a DL data to the relay node 1 and 2, respectively [S1313, S1315].

In this case, in the steps of S1313 and S1315, a sequence of transmitting the PDSCH to the relay node 1 and 2 by the base station can be simultaneously performed and the PDSCH can be transmitted to the relay node 2 first.

The relay node 1 and 2 demodulates the PDSCH using the antenna port information and the scramble ID included in the R-PDCCH [S1317, S1319]. In particular, the relay node 1 demodulates the PDSCH using the (A') and the relay node 2 demodulates the PDSCH using the (B').

Meanwhile, although the step of transmitting the R-PDCCH to each of the relay nodes by the base station and the step of transmitting the PDSCH to each of the relay nodes by the base station are distinguished for clarity, the R-PDCCH and the PDSCH can be transmitted together in one subframe.

And, the antenna port information and the scramble ID configured to the relay node 1 and 2 in advance or delivered via the upper layer signaling can be called a first antenna port information or a first scramble ID and the antenna port information and the scramble ID transmitted to the relay node 1 and 2 via the R-PDCCH can be called a second antenna port information and/or a second scramble ID.

Figure 14:
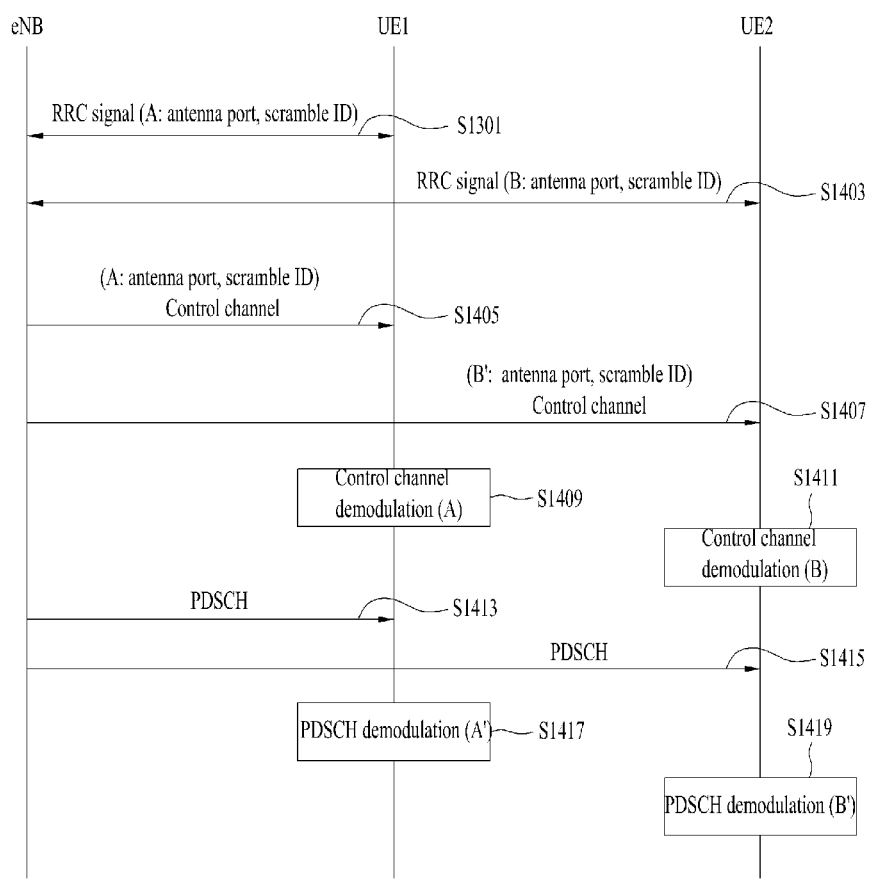
FIG. 14 is a flowchart indicating a method for a base station to configure a scramble ID and/or an antenna port to a user equipment according to one embodiment of the present invention.

FIG. 14 is a flowchart indicating a method for a base station to configure a scramble ID and/or an antenna port to a user equipment according to one embodiment of the present invention.

Referring to FIG. 14, the base station transmits the antenna port information and the scramble ID to a user equipment 1 (or a first user equipment) via an upper layer signaling (e.g., RRC signal) [S1401]. And, the base station may be able to transmit the antenna port information and the scramble ID to a user equipment 2 (or a second user equipment) via the upper layer signaling (RRC signal) [S 1403]. In this case, a sequence of transmitting the antenna port information and the scramble ID to the user equipment 1 and 2 by the base station can be simultaneously performed and the antenna port information and the scramble ID can be transmitted to the user equipment 2 first.

And, the steps of S1401 and S1403 may not be performed. In this case, the antenna port information and the scramble ID for transmitting and receiving a control channel may be configured in advance on a system.

For clarity, the antenna port information and the scramble ID transmitted to the user equipment 1 by the base station via the RRC signal is called (A) and the antenna port information and the scramble ID transmitted to the user equipment 2 by the base station via the RRC signal is called (B) in the following description. In this case, the (A) and the (B) may be identical or different from each other. In case that the (A) and the (B) are different from each other, either the antenna port information or the scramble ID may be different or both of the antenna port information and the scramble ID may be different.

The base station transmits the control channel including the antenna port information and the scramble ID for transmitting the PDSCH to the user equipment 1 and 2, respectively [S1405, S1407]. In this case, the control channel to which transmitted to the user equipment 1 and 2 may include both the antenna port information and the scramble ID for transmitting the PDSCH and only the control channel transmitted to a prescribed user equipment may be able to include the antenna port information and the scramble ID. And, the control channel transmitted to the user equipment 1 or 2 may include either the antenna port information or the scramble ID only. In the following description, assume that the control channel transmitted to the user equipment 1 and 2 includes both the antenna port information and the scramble ID.

In the steps of S 1405 and S 1407, a sequence of transmitting the control channel to the user equipment 1 and 2 by the base station can be simultaneously performed and the control channel can be transmitted to the user equipment 2 first.

For clarity, the antenna port information and the scramble ID delivered to the user equipment 1 by the base station via the control channel for transmitting the PDSCH is called (A') and the antenna port information and the scramble ID delivered to the user equipment 2 by the base station via the control channel for transmitting the PDSCH is called (B') in the following description. In this case, the (A') and the (B') may be identical or different from each other. In case that the (A') and the (B') are different from each other, either the antenna port information or the scramble ID may be different or both of the antenna port information and the scramble ID may be different. Moreover, the (A) and the (A') may be identical or different from each other. And, the (B) and the (B') may be identical or different from each other. In case of being different from each other, either the antenna port information or the scramble ID may be different or both of the antenna port information and the scramble ID may be different.

The user equipment 1 and 2 demodulates the control channel using the pre-set antenna port information and the scramble ID or the antenna port information and the scramble ID received via the upper layer signaling (RRC signal) and checks the antenna port information and the scramble ID information for transmitting the PDSCH included in the control channel [S 1409, S1411]. In particular, the user equipment 1 demodulates the control channel using the (A) and the user equipment 2 demodulates the control channel using the (B).

The base station transmits the PDSCH including a DL data to the user equipment 1 and 2, respectively [S1413, S1415].

In this case, in the steps of S1413 and S1415, a sequence of transmitting the PDSCH to the user equipment 1 and 2 by the base station can be simultaneously performed and the PDSCH can be transmitted to the user equipment 2 first.

The user equipment 1 and 2 demodulates the PDSCH using the antenna port information and the scramble ID included in the control channel [S1417, S1419]. In particular, the user equipment 1 demodulates the PDSCH using the (A') and the user equipment 2 demodulates the PDSCH using the (B').

Meanwhile, although the step of transmitting the control channel to each of the user equipments by the base station and the step of transmitting the PDSCH to each of the user equipments by the base station are distinguished for clarity, the control channel and the PDSCH can be transmitted together in one subframe.

And, the antenna port information and the scramble ID configured to the user equipment 1 and 2 in advance or delivered via the upper layer signaling can be called a first antenna port information or a first scramble ID and the antenna port information and the scramble ID transmitted to the relay node 1 and 2 via the control channel can be called a second antenna port information and/or a second scramble ID.

Figure 15:
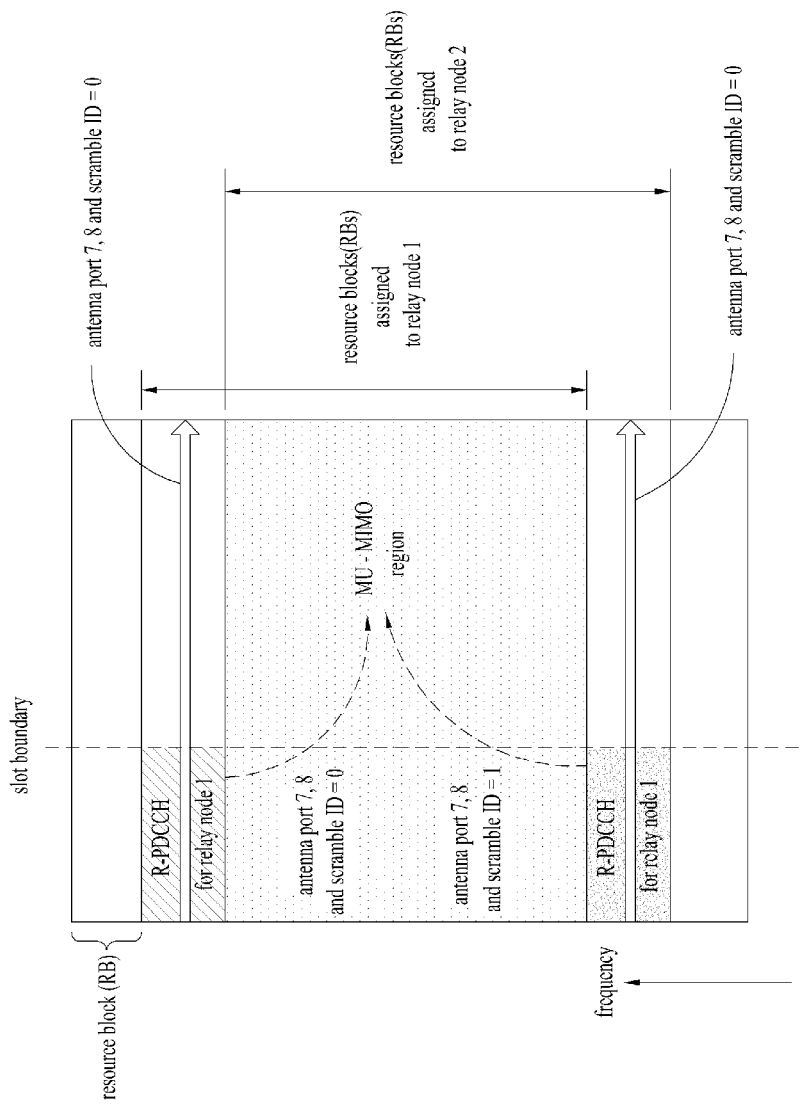
FIG. 15 is a diagram for an example of radio resource blocks configured with a scramble ID different from each other according to a relay node different from each other according to one embodiment of the present invention.

FIG. 15 is a diagram for an example of radio resource blocks configured with a scramble ID different from each other according to a relay node different from each other according to one embodiment of the present invention. For clarity, assume that the antenna ports of the transmitting ends of the relay node 1 and 2 for transmitting the PDSCH are determined as 7 and 8 and the scramble ID is determined as 0.

Referring to FIG. 15, similar to FIG. 12, the base station transmits R-PDCCH including a control information and PDSCH including a data to the relay node 1 and the relay node 2, respectively. And, the base station transmits the PDSCH in a frequency and time region of a radio resource block except the region to which the R-PDCCH is allocated. And, a part of the region among the resource block transmitted to the relay node 1 and the resource block transmitted to the relay node 2 may be able to share the time and frequency resource identical with each other. For clarity, the part of the region is called an MU-MIMO region.

The base station transmits the R-PDCCH to the relay node 1 and 2 via a frequency and time resource different from each other, respectively. In particular, in order for the relay node 1 and 2 to distinguish the R-PDCCH received by the relay node 1 and 2, the base station does not assign an identical frequency and time region to the R-PDCCH, which is transmitted to the relay node 1 and 2. Each of the relay nodes demodulates the R-PDCCH using the antenna port and the scramble ID configured in advance or the antenna port and the scramble ID configured via the upper layer signal (e.g., RRC signal).

In this case, a part of a resource block pair to which the R-PDCCH is transmitted can be assigned to the PDSCH. For instance, in the resource block pair to which the R-PDCCH is transmitted, a part of a first slot is assigned to the R-PDCCH and the rest of the slot can be assigned to the PDSCH. As mentioned above, in case that a part of the resource block pair is assigned to the PDSCH in the resource block pair to which the R-PDCCH is transmitted, it is preferable that the relay node identically uses the antenna port and the scramble ID used for the R-PDCCH to demodulate the PDSCH. If the PDSCH transmitted via a part of the resource block pair to which the R-PDCCH is transmitted is modulated by an antenna port and/or a scramble ID different from the R-PDCCH, interference occurs at a reference signal for demodulating the R-PDCCH existing in the first slot and it may degrade control channel reception performance. This is called an implicit assignment.

On the contrary, a transmitting end may be able to differently configure the antenna port and the scramble ID used for the resource block pair to which the R-PDCCH is transmitted from the antenna port and/or the scramble ID used for the resource block pair to which the R-PDCCH is not transmitted. In particular, the antenna port and/or the scramble ID used for the resource block pair to which the R-PDCCH is transmitted utilizes the same one used for the R-PDCCH. Yet, in case of the other resource block pair, an antenna port and a SCID, which are designated by the control information included in the R-PDCCH, can be used.

Specifically, the transmitting end can configure the relay node 1 and 2 to use the antenna port and the scramble ID different from each other in the MU-MIMO region sharing time and frequency resource via the R-PDCCH. In particular, the transmitting end may be able to transmit scramble ID configuration information, which is used for demodulating the MU-MIMO region, to each of the relay nodes via the R-PDCCH. Each of the relay nodes demodulates the MU-MIMO region using the scramble ID configuration information transmitted via the R-PDCCH. For instance, the relay node 1 can be configured to use a scramble ID 0 and the relay node 2 can be configured to use a scramble ID 1. In this case, separate information is not transmitted to the relay node 1 via the R-PDCCH and the scramble ID configuration information can be transmitted to the relay node 2 only. Each of the relay nodes may be able to distinguish the signal transmitted to the each of the relay nodes by demodulating the MU-MIMO region according to the scramble ID configuration information received via the R-PDCCH and may be able to perform an MI-MIMO operation at last.

And, the transmitting end may be able to differently configure the antenna port for demodulating the MU-MIMO region according to each of the relay nodes. In this case, when a signal different from each other is transmitted by a plurality of relay nodes in a manner of sharing time and frequency resource, each signal is transmitted via an antenna port different from each other and antenna port information can be delivered via the R-PDCCH in order for a receiving end to know the information on each of the antenna ports. Each of the relay nodes may be able to distinguish the signal transmitted to the each of the relay nodes by demodulating the MU-MIMO region according to the antenna port configuration information received via the R-PDCCH. As mentioned in the foregoing description, the base station may be able to transmit the scramble ID and/or the antenna port configuration information for demodulating the MU-MIMO region via the R-PDCCH.

Meanwhile, for clarity, although it is explained under the assumption that the scramble ID and/or the antenna port configuration used for the R-PDCCH is implicitly configured to demodulate PDSCH in an identical resource block pair, the scramble ID and/or the antenna port configuration used for the R-PDCCH can be applied to a resource block bundle unit capable of being applied a precoding identical to the resource block to which the R-PDCCH is transmitted. The resource block bundle means the resource block pair more than 2.

Specifically, each of the resource block bundles performing the precoding identical to the R-PDCCH, which is transmitted to a plurality of the relay nodes, does not share an identical time and frequency resource. In particular, a region except the resource block bundle may become the MU-MIMO region. Each of the relay nodes demodulate the resource block bundle including the R-PDCCH using the antenna port and the scramble ID configured in advance or configured via the upper layer signal (e.g., RRC signal). On the contrary, in case of the MU-MIMO region, each of the relay nodes demodulates the MU-MIMO region using the scramble ID configuration information and/or the antenna port information received via the R-PDCCH.

Although embodiment according to FIG. 15 is explained under the assumption of using relay nodes only, it can be identically applied to a case that a receiving end corresponds to a user equipment as well.

Figure 16:
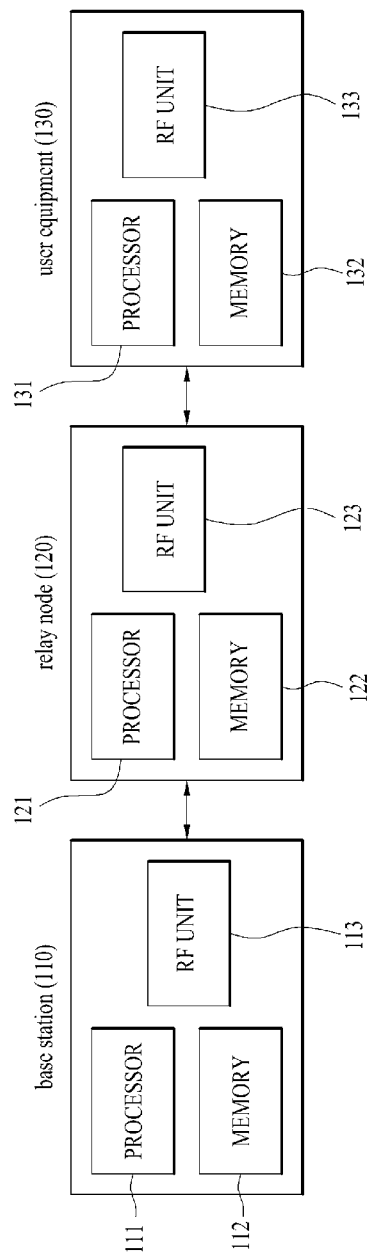
FIG. 16 is a block diagram indicating a wireless communication system by which the present invention is implementable.

FIG. 16 is a block diagram indicating a wireless communication system by which the present invention is implementable.

Referring to FIG. 16, a wireless communication system include a base station 110, a relay node 120 positioned within a region of the base station 110, and a plurality of user equipments 130.

The base station 110 includes a processor 111, a memory 112, and an RF (radio frequency) unit 113. The processor 111 implements a proposed function, a process, and/or a method. Layers of a radio interface protocol can be implemented by the processor 111. The memory 112 is connected with the processor 111 and stores various informations to operate the processor 111. The RF unit 113 is connected with the processor 111 and transmits and/or receives a radio signal.

The relay node 120 includes a processor 121, a memory 122, and an RF unit 123. The processor may be able to implement methods proposed by the present invention. The memory 122 is connected with the processor 121 and stores various informations to operate the processor 121. The RF unit 123 is connected with the processor 121 and transmits and/or receives a radio signal.

The user equipment 130 includes a processor 131, a memory 132, and an RF (radio frequency) unit 133. The processor 131 implements a proposed function, a process, and/or a method. Layers of a radio interface protocol can be implemented by the processor 131. The memory 132 is connected with the processor 131 and stores various informations to operate the processor 131. The RF unit 133 is connected with the processor 131 and transmits and/or receives a radio signal.

The memory 112/122/132 can be situated at inside or outside of the processor 111/121/131 and can be connected to the processor 111/121/131 with a well-known means. And, the base station 110, the relay node 120, and/or the user equipment 130 may have single or multiple antennas.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

In this specification, embodiments of the present invention are described centering on the data transmission/reception relations between a user equipment, relay node and a base station. In this disclosure, a specific operation explained as performed by a base station may be performed by an upper node of the base station in some cases. In particular, in a network constructed with a plurality of network nodes including a base station, it is apparent that various operations performed for communication with a user equipment can be performed by a base station or other network nodes except the base station. 'Base station (BS)' may be substituted with such a terminology as a fixed station, a Node B, an eNode B (eNB), an access point (AP) and the like. And, 'terminal' may be substituted with such a terminology as a user equipment (UE), a mobile station (MS), a mobile subscriber station (MSS), and the like.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

Industrial Applicability

Although a method of transmitting and receiving a data in a multi user-MIMO antenna scheme supportive of wireless communication system is described with reference to the example applied to 3GPP LTE system, it may be applicable to various kinds of wireless communication systems supporting the multi user-MIMO antenna scheme as well as to the 3GPP LTE system.

What is claimed is:

1. A method of receiving data at a relay node in a wireless communication system supporting a Multi User-Multiple Input Multiple Output (Multi User-MIMO) antenna scheme, the method comprising:

receiving, by the relay node, a relay physical downlink control channel (R-PDCCH) from a base station using a first antenna port information and a first scramble identity (SCID) via a resource block (RB) pair, wherein the R-PDCCH comprises information related to at least one of a second antenna port information and a second SCID; and receiving, by the relay node, a downlink data channel from the base station using the R-PDCCH, wherein the downlink data is received using the first antenna port and the first SCID if a region in which the downlink data is received is assigned to a part of a RB bundle applied a precoding identical to a precoding applied to the RB pair via which the R-PDCCH is received, and wherein the downlink data is received using the second antenna port and the second SCID indicated by the R-PDCCH if the region is assigned to a part of a RB bundle applied a precoding different from the precoding applied to the RB pair via which the R-PDCCH is received.

2. The method of claim 1, wherein frequency and time resources of the downlink data are overlapped with frequency and time resources of downlink data transmitted to a different relay node if the region is assigned to a part of a RB bundle applied a precoding different to the RB pair via which the R-PDCCH is received.

3. The method of claim 1, wherein the first antenna port information and the first SCID are received from the base station via an upper layer signal.

4. The method of claim 1, wherein at least one of the second antenna port information and the second SCID is different from at least one of an antenna port information and a SCID configured to a different relay node.

5. A relay node in a wireless communication system supporting a Multi User-Multiple Input Multiple Output (Multi User-MIMO) antenna scheme, the relay node comprising:

a radio frequency (RF) unit; and a processor configured to control the RF unit, wherein the processor is further configured to:

receive a relay physical downlink control channel (R-PDCCH) from a base station using a first antenna port information and a first scramble identity (SCID) via a resource block (RB) pair, wherein the R-PDCCH comprises information related to at least one of a second antenna port information and a second SCID, receive downlink data from the base station using the R-PDCCH, wherein the downlink data is received using the first antenna port and the first SCID if a region in which the downlink data is received is assigned to a part of a RB bundle applied a precoding identical to a precoding applied to the RB pair via which the R-PDCCH is received, and wherein the downlink data is received using the second antenna port and the second SCID indicated by the R-PDCCH if the region is assigned to a part of a RB bundle applied a precoding different from the precoding applied to the RB pair via which the R-PDCCH is received.

6. The relay node of claim 5, wherein frequency and time resources of the downlink data are overlapped with frequency and time resources for downlink data transmitted to a different relay node if the region is assigned to a part of a RB bundle applied a precoding different to the RB pair via which the R-PDCCH is received.

7. The relay node of claim 5, wherein the first antenna port information and the first SCID are configured via an upper layer signal from the base station.

8. The relay node of claim 5, wherein at least one of the second antenna port information and the second SCID is different from an antenna port information and a SCID configured to a different relay node.

9. A method of transmitting a data, which is transmitted by a base station in a wireless communication system supporting a Multi User-Multiple Input Multiple Output (Multi User-MIMO) antenna scheme, the method comprising:

transmitting a relay physical downlink control channel (R-PDCCH) to a relay node using a first antenna port information and a first scramble identity (SCID) via a resource block (RB) pair, wherein the R-PDCCH comprises information related to at least one of a second antenna port information and a second SCID; and transmitting downlink data to the relay node using the R-PDCCH, wherein the downlink data is transmitted using the first antenna port and the first SCID if a region in which the downlink data is received is assigned to a part of a RB bundle applied a precoding identical to a precoding applied to the RB pair via which the R-PDCCH is received, and wherein the downlink data is transmitted using the second antenna port and the second SCID indicated by the R-PDCCH if the region is assigned to a part of a RB bundle applied a precoding different from the precoding applied to the RB pair via which the R-PDCCH is received.

10. The method of claim 9, wherein frequency and time resources are overlapped with frequency and time resources of a downlink data transmitted to a different relay node if the region is assigned to a part of a RB bundle applied a precoding different to the RB pair via which the R-PDCCH is received.

11. The method of claim 9, wherein the first antenna port information and the first SCID are transmitted to the relay node via an upper layer signal.

12. The method of claim 9, wherein at least one of the second antenna port information and the second SCID is different from at least one of an antenna port information and a SCID configured to a different relay node.

13. A base station in a wireless communication system supporting a Multi User-Multiple Input Multiple Output (Multi User-MIMO) antenna scheme, the base station comprising:

a radio frequency (RF) unit; and a processor configured to control the RF unit, wherein the processor is further configured to:

transmit a relay physical downlink control channel (R-PDCCH) to a relay node using a first antenna port information and a first SCID via a resource block (RB) pair, wherein the R-PDCCH comprises information related to at least one of a second antenna port information and a second SCID, and transmit downlink data to the relay node using the R-PD-CCH, wherein the downlink data is transmitted using the first antenna port and the first SCID if a region in which the downlink data is received is assigned to a part of a RB bundle applied a precoding identical to a precoding applied to the RB pair via which the R-PDCCH is received, and wherein the data is transmitted using the second antenna port and the second SCID indicated by the R-PDCCH if the region is assigned to a part of a RB bundle applied a precoding different from the precoding applied to the RB pair via which the R-PDCCH is received.

14. The base station of claim 13, wherein frequency and time resources are overlapped with frequency and time resources of downlink data transmitted to a different relay node.

15. The base station of claim 13, wherein the first antenna port information and the first SCID are transmitted to the relay node via an upper layer signal.

16. The base station of claim 13, wherein at least one of the second antenna port information and the second SCID is different from at least one of an antenna.

* * * * *